(12) United States Patent
Kusuhara et al.

(10) Patent No.: US 12,311,919 B2
(45) Date of Patent: May 27, 2025

(54) INFORMATION PROCESSING DEVICE AND INFORMATION PROCESSING METHOD

(71) Applicants: DENSO CORPORATION, Kariya (JP); TOYOTA JIDOSHA KABUSHIKI KAISHA, Toyota (JP)

(72) Inventors: Shunsuke Kusuhara, Kariya (JP); Yuki Minase, Toyota (JP); Motonari Ohbayashi, Nagakute (JP); Yutaka Hamamoto, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 539 days.

(21) Appl. No.: 17/404,535

(22) Filed: Aug. 17, 2021

(65) Prior Publication Data

US 2021/0370919 A1    Dec. 2, 2021

Related U.S. Application Data

(63) Continuation of application No. PCT/JP2020/001527, filed on Jan. 17, 2020.

(30) Foreign Application Priority Data

Feb. 19, 2019    (JP) .................................. 2019-027680

(51) Int. Cl.
    *B60W 30/06*    (2006.01)
    *B60W 40/02*    (2006.01)
    *B62D 15/02*    (2006.01)

(52) U.S. Cl.
    CPC ............ *B60W 30/06* (2013.01); *B60W 40/02* (2013.01); *B62D 15/027* (2013.01);
    (Continued)

(58) Field of Classification Search
    CPC .......... B60W 30/06; B60W 2554/805; B60W 2554/4044; B60W 2554/4049; B60W 2556/25; B62D 15/027
    (Continued)

(56) References Cited

U.S. PATENT DOCUMENTS

2015/0109164 A1    4/2015    Takaki
2016/0114795 A1*   4/2016    Kiyokawa ............. G01S 13/931
                                                  342/55
(Continued)

FOREIGN PATENT DOCUMENTS

JP    H06-150195 A    5/1994
JP    2004-226120 A   8/2004
(Continued)

*Primary Examiner* — Luis A Martinez Borrero
(74) *Attorney, Agent, or Firm* — Maschoff Brennan

(57) ABSTRACT

An information processing device for a vehicle includes an object detecting unit, an object information storage unit, and an object information management unit. The object detecting unit detects, based on an output of a sensor mounted on the vehicle, an object located around the vehicle. The object information storage unit stores, as object information, information about the object detected by the object detecting unit. The object information management unit is configured to: receive, from a travelling assistance unit that performs an assistance operation of assisting travelling of the vehicle based on the object information, related information, the related information being related to the assistance operation performed by the travelling assistance unit; determine storage priority of the object information in the object information storage unit based on the related information; and manage a storage state of the object information in the object information storage unit based on the storage priority.

24 Claims, 8 Drawing Sheets

(52) U.S. Cl.
CPC .............. *B60W 2554/4044* (2020.02); *B60W 2554/4049* (2020.02); *B60W 2554/805* (2020.02); *B60W 2556/25* (2020.02)

(58) Field of Classification Search
USPC .......................................................... 701/41
See application file for complete search history.

(56) References Cited

U.S. PATENT DOCUMENTS

| | | | | |
|---|---|---|---|---|
| 2016/0355178 | A1* | 12/2016 | Shiraishi | ............. B60W 60/001 |
| 2017/0345300 | A1 | 11/2017 | Kawai et al. | |
| 2018/0043905 | A1* | 2/2018 | Kim | ..................... B60W 10/20 |
| 2018/0090006 | A1 | 3/2018 | Ikenouchi et al. | |
| 2018/0093662 | A1* | 4/2018 | Kim | ......................... B60R 1/31 |
| 2018/0093663 | A1* | 4/2018 | Kim | ......................... G08G 1/166 |
| 2018/0232967 | A1 | 8/2018 | Segawa et al. | |
| 2019/0073902 | A1* | 3/2019 | Indoh | ..................... G06V 20/58 |
| 2019/0118801 | A1* | 4/2019 | Noh | ..................... B60W 30/095 |
| 2020/0070814 | A1* | 3/2020 | Park | ..................... B60W 40/105 |
| 2020/0156625 | A1* | 5/2020 | Kogure | .................. G06V 20/58 |
| 2020/0242943 | A1* | 7/2020 | Kuwabara | .......... B62D 15/0285 |

FOREIGN PATENT DOCUMENTS

| | | | | |
|---|---|---|---|---|
| JP | 2008-139320 | A | | 6/2008 |
| JP | 2009-83647 | A | * 4/2009 | ............. B60R 21/00 |
| JP | 2009-083647 | A | | 4/2009 |
| JP | 2012-027767 | A | | 2/2012 |
| JP | 2012-146025 | A | | 8/2012 |
| JP | 2013-189076 | A | | 9/2013 |
| JP | 2014-094725 | A | | 5/2014 |
| JP | 2015-078926 | A | | 4/2015 |
| JP | 2017-007499 | A | | 1/2017 |
| JP | 2017-211817 | A | | 11/2017 |
| JP | 2018-054470 | A | | 4/2018 |
| JP | 2018-133085 | A | | 8/2018 |

\* cited by examiner

INFORMATION PROCESSING DEVICE AND INFORMATION PROCESSING METHOD

CROSS-REFERENCE TO RELATED APPLICATION

The present application is a continuation application of International Application No. PCT/JP2020/001527, filed on Jan. 17, 2020, which claims priority to Japanese Patent Application No. 2019-027680, filed on Feb. 19, 2019. The contents of these applications are incorporated herein by reference in their entirety.

BACKGROUND

Technical Field

The present disclosure relates to an information processing device and an information processing method for a vehicle.

Background Art

A radar device registers, when a recognized target is lost, the target as a lost target. Furthermore, this radar device deletes, among lost targets, a target that has been detected again and a target that has not been detected again within a grace period.

SUMMARY

In the present disclosure, provided is an information processing device for a vehicle as the following.

The information processing device for a vehicle includes an object detecting unit, an object information storage unit, and an object information management unit. The object information management unit is configured to: receive related information; determine storage priority of an object information in the object information storage unit based on the related information; and manage a storage state of the object information in the object information storage unit based on the storage priority.

DETAILED DESCRIPTION OF THE PREFERRED EMBODIMENTS

[PTL 1] JP 2004-226120 A

Figure 1:
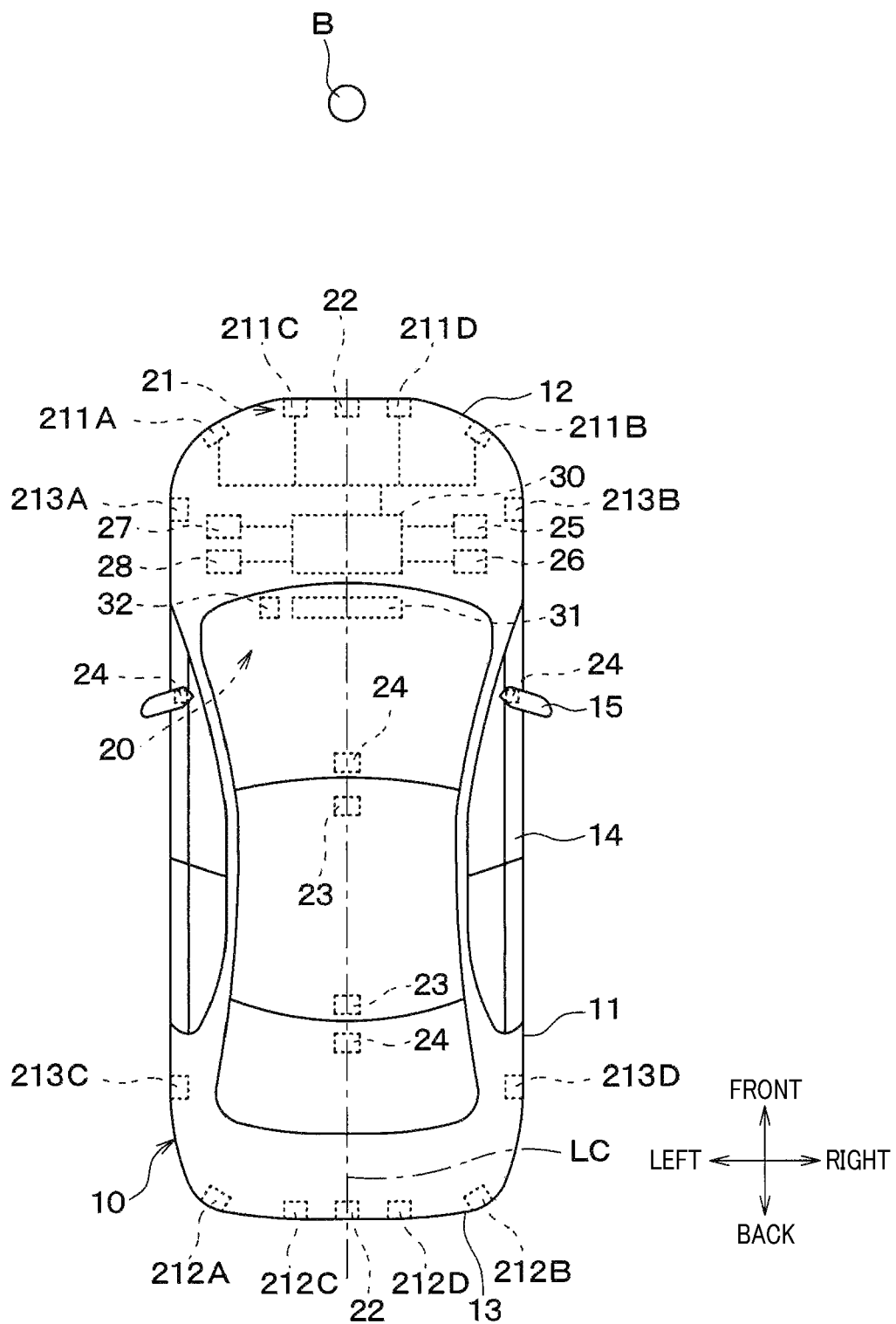
FIG. 1 is a plan view showing an outline configuration of a vehicle equipped with an information processing device according to an embodiment.

In the radar device disclosed in Patent Literature (PTL) 1, the result of object detecting using various in-vehicle sensors such as a radar sensor is important information for driving assistance for vehicles. At the time of driving assistance for vehicles, in addition to the detecting result related to an object that is being currently detected, the past detecting result related to an object that is not being currently detected may also be used. However, keeping all the past detecting results stored is not appropriate in terms of storage capacity and processing load.

In this regard, for example, a method for deleting the detecting results in time series from oldest may be used. Alternately, for example, a method for deleting the past detecting result related to an object that has not been detected again within a predetermined period, as described in PTL 1, may be used. However, the past information that is oldest in time series is not always the least useful information. Similarly, even past information related to an object that has not been detected again within the predetermined period may become useful later on.

The present disclosure is conceived in view of the circumstances described above as an example. Specifically, the present disclosure provides a configuration and a method that enable better management of the storage state of the object detecting result, for example.

According to one aspect of the present disclosure, an information processing device for a vehicle includes:

an object detecting unit configured to detect, based on an output of a sensor mounted on the vehicle, an object located around the vehicle;

an object information storage unit configured to store, as object information, information about the object detected by the object detecting unit; and an object information management unit configured to:

receive, from a travelling assistance unit that performs an assistance operation of assisting travelling of the vehicle based on the object information, related information, the related information being related to the assistance operation performed by the travelling assistance unit;

determine storage priority of the object information in the object information storage unit based on the related information; and manage a storage state of the object information in the object information storage unit based on the storage priority.

According to another aspect of the present disclosure, an information processing method includes the following steps of:

detecting, based on an output of a sensor mounted on the vehicle, an object located around the vehicle;

storing, into an object information storage unit, as object information, information about the object detected by the object detecting unit;

receiving, from a travelling assistance unit that performs an assistance operation of assisting travelling of the vehicle based on the object information, related information, the related information being related to the assistance operation performed by the travelling assistance unit;

determining storage priority of the object information in the object information storage unit based on the related information; and managing a storage state of the object information in the object information storage unit based on the storage priority.

In the above configuration and method, the object information that is the result of detecting the object is stored into the object information storage unit. The storage state of the object information in the object information storage unit is managed based on the storage priority. The storage priority is determined based on the related information related to the travelling assistance operation in the travelling assistance unit, the related information being received from the travelling assistance unit.

Thus, with the above configuration and method, the storage state of the object information in the object information storage unit is managed based on the related information related to the travelling assistance operation in the travelling assistance unit. This enables better management of the storage state of the result of detecting the object.

Note that in various sections of the application documents, elements may be assigned reference signs in parentheses. In this case, the reference signs represent a mere example of correspondence relationships between the elements and specific configurations described in the embodiment to be described later. Thus, the present disclosure is not limited by the reference signs.

Embodiment

Hereinafter, an embodiment of the present disclosure will be described with reference to the drawings. Note that insertion of various applicable modifications of one embodiment into the sequential description about the embodiment may inhibit understanding of the embodiment. Therefore, the modifications will be collectively described after the sequential description about the embodiment, instead of being described in the middle thereof.

(Overall Configuration of Vehicle)

In FIG. 1, a vehicle 10 is what is called a four-wheeled vehicle and includes a vehicle body 11 which is substantially rectangular in a plan view. Hereinafter, in the plan view, a virtual straight line passing through the center of the vehicle 10 in the vehicle width direction and extending parallel to the overall vehicle length direction of vehicle 10 will be referred to as a vehicle center line LC. The overall vehicle length direction is perpendicular to the vehicle width direction and the vehicle height direction. The vehicle height direction is for defining the height of the vehicle 10 and is parallel to a direction in which gravity acts in the case where the vehicle 10 is in a horizontal plane. In FIG. 1, the overall vehicle length direction is the vertical direction in the figure, and the vehicle width direction is the lateral direction in the figure.

The "front", the "back", the "left", and the "right" of the vehicle 10 are defined as indicated by the arrows in FIG. 1. In other words, the overall vehicle length direction is synonymous to the longitudinal direction (front-back direction). The vehicle width direction is synonymous to the lateral direction (left-right direction). The shape of each portion of the vehicle 10 in the "plan view" represents the shape thereof in the case where the portion is viewed in the same direction as the direction in which gravity acts with the vehicle 10 positioned in the horizontal plane.

A front bumper 12 is attached to the front end of the vehicle body 11. A rear bumper 13 is attached to the rear end of the vehicle body 11. A door panel 14 is attached to a side surface portion of the vehicle body 11. In the specific example shown in FIG. 1, a total of four door panels 14, two each on the left and right sides, are provided. A door mirror 15 is attached to each of the pair of door panels 14 on the front left and right sides.

An object detecting device 20 is mounted on the vehicle 10. The vehicle 10 with the object detecting device 20 mounted thereon may hereinafter be referred to as an "own vehicle". The object detecting device 20 for the vehicle 10 is configured to, when mounted on the own vehicle, detect an object B located outside the own vehicle.

Specifically, the object detecting device 20 includes a sonar sensor 21, a millimeter-wave radar sensor 22, a LIDAR sensor 23, and an image sensor 24, as object detecting sensors. The LIDAR stands for light detection and ranging or laser imaging detection and ranging and may also be referred to as a "laser radar". Furthermore, in order to detect the travelling state of the own vehicle to be taken into consideration at the time of detecting the object B, the object detecting device 20 includes a vehicle speed sensor 25, a shift position sensor 26, a steering angle sensor 27, and a yaw rate sensor 28. Moreover, the object detecting device 20 includes an information processing device 30, a display unit 31, and a loudspeaker 32. Note that for the sake of simplifying illustration, the relationship of electrical connection between portions included in the object detecting device 20 is omitted in FIG. 1 as necessary.

The sonar sensor 21 is provided so as to transmit probe waves from the own vehicle, receive reception waves including reflection waves resulting from the probe waves being reflected by the object B, and thus output distance measurement information which is information on detecting the object B. The distance measurement information is included in output signals of the sonar sensor 21 and corresponds to the distance between the object B located around the own vehicle and the own vehicle. In the present embodiment, the sonar sensor 21 is what is called an ultrasonic sensor and is configured to transmit probe waves that are ultrasonic waves and receive reception waves including the ultrasonic waves.

A plurality of sonar sensors 21 are mounted on the own vehicle. The respective sonar sensors 21 are provided at different positions in the plan view. Furthermore, in the present embodiment, the respective sonar sensors 21 are located shifted on one of the left and right sides of the vehicle center line LC in the vehicle width direction.

Specifically, in the present embodiment, a first front sonar 211A, a second front sonar 211B, a third front sonar 211C, and a fourth front sonar 211D are attached to the front bumper 12 as sonar sensors 21. Similarly, a first rear sonar 212A, a second rear sonar 212B, a third rear sonar 212C, and a fourth rear sonar 212D are attached to the rear bumper 13 as sonar sensors 21. Furthermore, a first side sonar 213A, a second side sonar 213B, a third side sonar 213C, and a fourth side sonar 213D are attached to side surface portions of the vehicle body 11. In the following description, the term "sonar sensor 21" is used when it is not specified which one of the first front sonar 211A and the like.

The "direct waves" and the "indirect waves" are defined as follows. One of the plurality of sonar sensors 21 is referred to as a "first distance measurement sensor", and another one of the plurality of sonar sensors 21 is referred to as a "second distance measurement sensor". Reception waves that are received by the first distance measurement sensor and that are caused by reflection waves resulting from the probe waves transmitted from the first distance measurement sensor being reflected by the object B, are referred to as the "direct waves". When reflection waves resulting from the probe waves transmitted from the first distance measurement sensor being reflected by the object B is detected by the first distance measurement sensor as reception waves, the reception waves serve as the direct waves typically. In other words, when the sonar sensor 21 that has transmitted probe waves and the sonar sensor 21 that has detected, as reception waves, reflection waves resulting from the probe waves being reflected by the object B are the same, the reception waves serve as the direct waves.

In contrast, reception waves that are received by the second distance measurement sensor and that are caused by reflection waves resulting from the probe waves transmitted from the first distance measurement sensor being reflected by the object B, are referred to as the "indirect waves". When reflection waves resulting from the probe waves transmitted from the first distance measurement sensor being reflected by the object B are detected by the second distance measurement sensor as reception waves, the reception waves serve as the indirect waves typically. In other words, when the sonar sensor 21 that has transmitted probe waves and the sonar sensor 21 that has detected, as reception waves, reflection waves resulting from the probe waves being reflected by the object B are different, the reception waves serve as the indirect waves.

The first front sonar 211A is provided at a left end portion of the front bumper 12 so as to transmit the probe waves to a left-side area in front of the own vehicle. The second front sonar 211B is provided at a right end portion of the front bumper 12 so as to transmit the probe waves to a right-side area in front of the own vehicle. The first front sonar 211A and the second front sonar 211B are symmetrically arranged with respect to the vehicle center line LC.

The third front sonar 211C and the fourth front sonar 211D are arranged in the vehicle width direction, at positions close to the center on the front bumper 12. The third front sonar 211C is disposed between the first front sonar 211A and the vehicle center line LC in the vehicle width direction, so as to transmit the probe waves to an area located approximately in front of the own vehicle. The fourth front sonar 211D is disposed between the second front sonar 211B and the vehicle center line LC in the vehicle width direction, so as to transmit the probe waves to an area located approximately in front of the own vehicle. The third front sonar 211C and the fourth front sonar 211D are symmetrically arranged with respect to the vehicle center line LC.

Each of the first front sonar 211A to the fourth front sonar 211D is provided so as to be able to receive the direct waves that are reflection waves resulting from the probe waves transmitted by the front sonar itself being reflected by the object B. Each of the first front sonar 211A to the fourth front sonar 211D is provided so as to be able to receive the indirect waves that are reflection waves resulting from the probe waves transmitted by other sonar sensors 21 including the sonar sensor 21 adjacent to the front sonar itself being reflected by the object B.

The first rear sonar 212A is provided at a left end portion of the rear bumper 13 so as to transmit the probe waves to a left-side area behind the own vehicle. The second rear sonar 212B is provided at a right end portion of the rear bumper 13 so as to transmit the probe waves to a right-side area behind the own vehicle. The first rear sonar 212A and the second rear sonar 212B are symmetrically arranged with respect to the vehicle center line LC.

The third rear sonar 212C and the fourth front sonar 212D are arranged in the vehicle width direction, at positions close to the center on the rear bumper 13. The third rear sonar 212C is disposed between the first rear sonar 212A and the vehicle center line LC in the vehicle width direction, so as to transmit the probe waves to an area located approximately behind the own vehicle. The fourth rear sonar 212D is disposed between the second rear sonar 212B and the vehicle center line LC in the vehicle width direction, so as to transmit the probe waves to an area located approximately behind the own vehicle. The third rear sonar 212C and the fourth rear sonar 212D are symmetrically arranged with respect to the vehicle center line LC.

Each of the first rear sonar 212A to the fourth rear sonar 212D is provided so as to be able to receive the direct waves that are reflection waves resulting from the probe waves transmitted by the rear sonar itself being reflected by the object B. Each of the first rear sonar 212A to the fourth rear sonar 212D is provided so as to be able to receive the indirect waves that are reflection waves resulting from the probe waves transmitted by other sonar sensors 21 including the sonar sensor 21 adjacent to the rear sonar itself being reflected by the object B.

The first side sonar 213A, the second side sonar 213B, the third side sonar 213C, and the fourth side sonar 213D are provided so as to transmit probe waves from the side surfaces of the vehicle body 11 to areas located lateral to the own vehicle. The first side sonar 213A and the second side sonar 213B are attached to a front portion of the vehicle body 11. The first side sonar 213A and the second side sonar 213B are symmetrically arranged with respect to the vehicle center line LC. The third side sonar 213C and the fourth side sonar 213D are attached to rear portions of the vehicle body 11. The third side sonar 213C and the fourth side sonar 213D are symmetrically arranged with respect to the vehicle center line LC.

The first side sonar 213A is provided on the left side surface of the front portion of the vehicle body 11 so as to transmit probe waves to an area located on the left side of the own vehicle. The first side sonar 213A is disposed between the first front sonar 211A and the left-side door mirror 15 in the longitudinal direction. The first side sonar 213A is provided so that one of the first side sonar 213A and the first front sonar 211A can detect, as reception waves, reflection waves resulting from the probe waves transmitted by the other being reflected by the object B.

The second side sonar 213B is provided on the right side surface of the front portion of the vehicle body 11 so as to transmit probe waves to an area located on the right side of the own vehicle. The second side sonar 213B is disposed between the second front sonar 211B and the right-side door mirror 15 in the longitudinal direction. The second side sonar 213B is provided so that one of the second side sonar 213B and the second front sonar 211B can detect, as reception waves, reflection waves resulting from the probe waves transmitted by the other being reflected by the object B.

The third side sonar 213C is provided on the left side surface of the rear portion of the vehicle body 11 so as to transmit probe waves to an area located on the left side of the own vehicle. The third side sonar 213C is disposed between the first rear sonar 212A and the left-side rear door panel 14 in the longitudinal direction. The third side sonar 213C is provided so that one of the third side sonar 213C and the first rear sonar 212A can detect, as reception waves, reflection waves resulting from the probe waves transmitted by the other being reflected by the object B.

The fourth side sonar 213D is provided on the right side surface of the rear portion of the vehicle body 11 so as to transmit probe waves to an area located on the right side of the own vehicle. The fourth side sonar 213D is disposed between the second rear sonar 212B and the right-side rear door panel 14 in the longitudinal direction. The fourth side sonar 213D is provided so that one of the fourth side sonar 213D and the second rear sonar 212B can detect, as reception waves, reflection waves resulting from the probe waves transmitted by the other being reflected by the object B.

Figure 2:
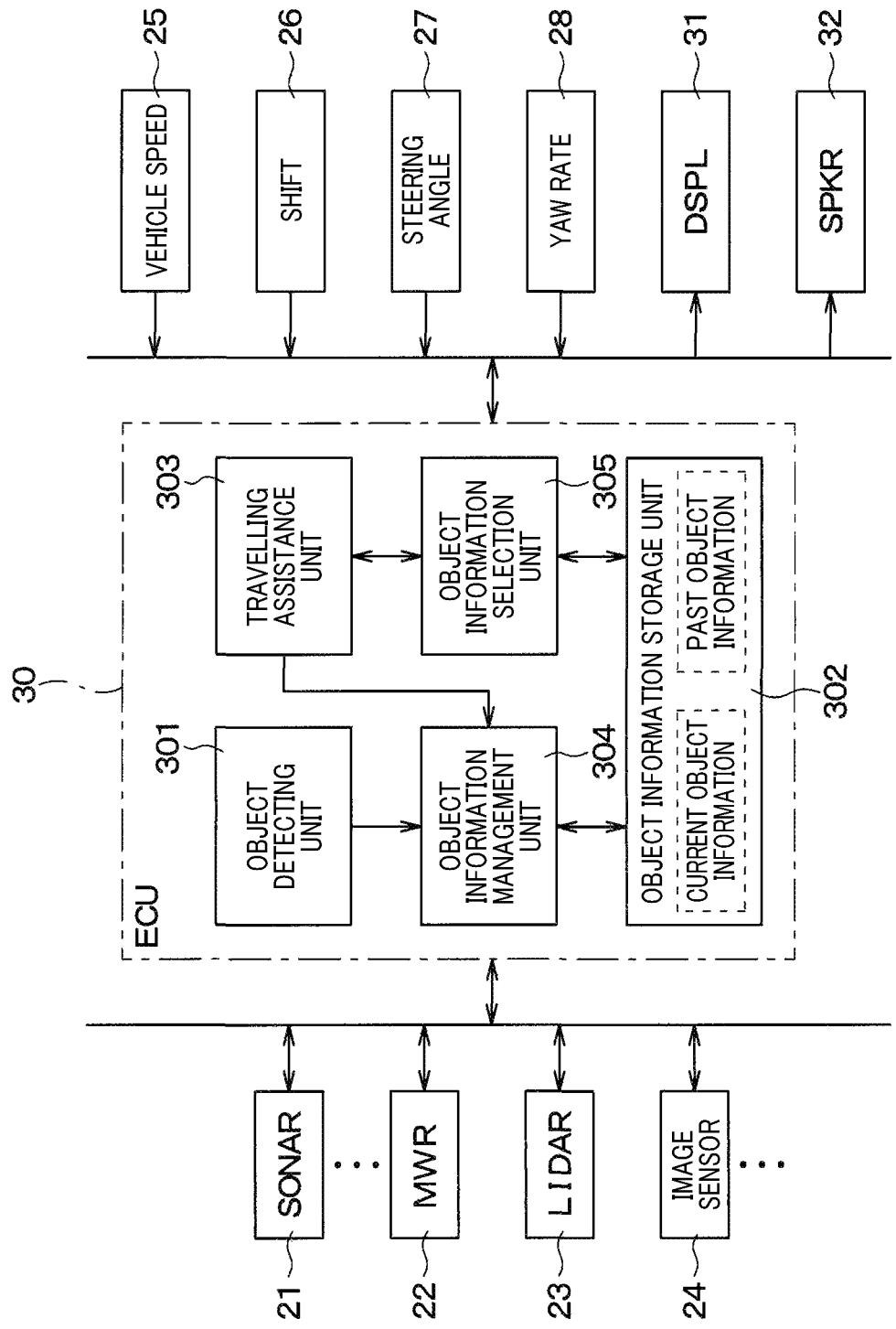
FIG. 2 is a block diagram schematically showing a functional configuration of the information processing device shown in FIG. 1.

Referring to FIGS. 1 and 2, the respective sonar sensors 21 are electrically connected to the information processing device 30 via in-vehicle communication lines. In other words, the respective sonar sensors 21 are provided so as to transmit and receive ultrasonic waves under control of the information processing device 30. Furthermore, the respective sonar sensors 21 are provided so as to generate output signals corresponding to the result of receiving the reception waves and transmit the output signals to the information processing device 30.

The millimeter-wave radar sensor 22 is provided so as to receive reflection waves resulting from the millimeter waves transmitted externally being reflected by the object B, and thereby output distance measurement information and azimuth information which are information on detecting the object B. The distance measurement information is included in output signals outputted from the millimeter-wave radar sensor 22 and corresponds to the distance between the object B located around the own vehicle and the own vehicle. The azimuth information is included in output signals outputted from the millimeter-wave radar sensor 22 and corresponds to the azimuth, that is, the direction from the own vehicle to the object B. The "azimuth" is an angle formed between the vehicle center line LC and a virtual straight line passing through both the object B and the millimeter-wave radar sensor 22 when viewed in a direction perpendicular to the overall vehicle length direction and the vehicle width direction, and may also be referred to as the "horizontal azimuth".

In the present embodiment, a front-detecting millimeter-wave radar sensor 22 and a rear-detecting the millimeter-wave radar sensor 22 are provided. The front-detecting millimeter-wave radar sensor 22 is disposed at a front end portion of the own vehicle so as to detect the object B located in front of the own vehicle. The rear-detecting millimeter-wave radar sensor 22 is disposed at a rear end portion of the own vehicle so as to detect the object B located behind the own vehicle.

The millimeter-wave radar sensors 22 are electrically connected to the information processing device 30 via in-vehicle communication lines. In other words, the millimeter-wave radar sensors 22 are provided so as to transmit millimeter waves externally, under control of the information processing device 30. Furthermore, the millimeter-wave radar sensors 22 are provided so as to generate output signals including the distance measurement information and the azimuth information obtained based on the reflection waves received, and transmit the output signals to the information processing device 30.

The LIDAR sensor 23 is provided so as to receive reflected light resulting from the laser light emitted externally being reflected by the object B, and thus output distance measurement information which is information on detecting the object B. The distance measurement information is included in output signals outputted from the LIDAR sensor 23 and corresponds to the distance between the object B located around the own vehicle and the own vehicle. In the present embodiment, a front-detecting LIDAR sensor 23 and a rear-detecting the LIDAR sensor 23 are provided. The front-detecting LIDAR sensor 23 is positioned facing forward so as to be able to detect the object B located in front of the own vehicle. The rear-detecting LIDAR sensor 23 is positioned facing rearward so as to be able to detect the object B located behind the own vehicle.

The LIDAR sensors 23 are electrically connected to the information processing device 30 via in-vehicle communication lines. In other words, the LIDAR sensors 23 are provided so as to emit laser light externally under control of the information processing device 30. Furthermore, the LIDAR sensors 23 are provided so as to generate output signals including the distance measurement information obtained based on the reflected light which is received, and transmit the output signal to the information processing device 30.

The image sensor 24 is provided so as to capture an image of the surrounding area of the own vehicle and generate and output image information corresponding to the captured image. In the present embodiment, the image sensor 24 is a digital camera device and includes a solid-state imaging element such as a CMOS sensor and a CCD sensor. The CMOS stands for a complementary MOS. The CCD stands for a charge coupled device.

In the present embodiment, image sensors for forward capture, rearward capture, leftward capture, and rightward capture, i.e., a total of four image sensors, are provided. The image sensor 24 for forward capture is disposed in a position close to the front portion of the own vehicle so as to detect the object B located in front of the own vehicle. The image sensor 24 for rearward capture is disposed in a position close to the rear portion of the own vehicle so as to detect the object B located behind the own vehicle. Each of the image sensor 24 for leftward capture and the image sensor 24 for rightward capture is attached to the corresponding one of the door mirrors 15 so as to detect the object B located lateral to the own vehicle.

Each of the image sensors 24 is electrically connected to the information processing device 30 via an in-vehicle communication line. In other words, each of the image sensors 24 is provided so as to capture an image of the surrounding area of the own vehicle under control of the information processing device 30. Furthermore, each of the image sensors 24 is provided so as to transmit the generated image information to the information processing device 30.

The vehicle speed sensor 25 is electrically connected to the information processing device 30 via an in-vehicle communication line. The vehicle speed sensor 25 is provided so as to generate a signal corresponding to the travel speed of the own vehicle and transmit the signal to the information processing device 30. The travel speed of the own vehicle will be hereinafter referred to simply as a "vehicle speed".

The shift position sensor 26 is electrically connected to the information processing device 30 via an in-vehicle communication line. The shift position sensor 26 is provided so as to generate a signal corresponding to the shift position of the own vehicle and transmit the signal to the information processing device 30.

The steering angle sensor 27 is electrically connected to the information processing device 30 via an in-vehicle communication line. The steering angle sensor 27 is provided so as to generate a signal corresponding to the steering angle of the own vehicle and transmit the signal to the information processing device 30.

The yaw rate sensor 28 is electrically connected to the information processing device 30 via an in-vehicle communication line. The yaw rate sensor 28 is provided so as to generate a signal corresponding to the yaw rate acting on the own vehicle and transmit the signal to the information processing device 30.

The information processing device 30 is disposed on the inside of the vehicle body 11. The information processing device 30 for the vehicle 10 according to the present embodiment is configured to perform predetermined operations based on the information and signals received from various sensors. The "various sensors" include a travelling state detecting sensor such as the vehicle speed sensor 25 in addition to the object detecting sensors such as the sonar sensor 21. The travelling state is the movement state of the own vehicle obtained by the vehicle speed sensor 25 or the like and may also be referred to as a "vehicle movement state" or a "driving state". The "predetermined operations" include an object detecting operation and a travelling assistance operation of the own vehicle based on the object detecting result. The "travelling assistance operation" includes a collision avoidance operation, a parking assistance operation, and a self-driving operation, for example. The "travelling assistance operation" may also be referred to as a "driving assistance operation". In particular, the operations of parking assistance, preventing turn accidents involving another vehicle or person, and so on are performed while the own vehicle travels at low speed, and therefore may also be referred to as "low-speed driving assistance". The "low-speed driving assistance" includes low-speed collision damage reduction braking. The low-speed collision damage reduction braking performs a braking operation for reducing low-speed collision damage. The "low-speed" includes a vehicle speed of 0 km/h at which the vehicle is parked. The low-speed collision damage reduction braking includes prevention of unintended start.

In the present embodiment, the information processing device 30 is an in-vehicle microcomputer that may also be referred to as an ECU, and includes a central processing unit (CPU), read-only memory (ROM), random-access memory (RAM), non-volatile RAM, and the like that are not shown in the drawings. The ECU stands for an electronic control unit. The non-volatile RAM is a storage device that stores information in such a manner as to allow rewriting while the power is ON an holds the information in such a manner as to not allow rewriting while the power is OFF; for example, the non-volatile RAM is flash ROM. The CPU, the ROM, the RAM, and the non-volatile RAM of the information processing device 30 will be hereinafter referred to simply as a "CPU", "ROM", "RAM", and "non-volatile RAM", respectively. The ROM, the RAM, and the non-volatile RAM are non-transitory, tangible storage media.

The information processing device 30 is configured to perform various control operations by the CPU reading a program in the ROM or the non-volatile RAM and executing the program. This program includes data corresponding to routines to be described later. Furthermore, various data to be used at the time of execution of the program are stored in the ROM or the non-volatile RAM in advance. The various data includes a default value, a lookup table, and a map, for example.

The display unit 31 and the loudspeaker 32 are disposed in the interior of the own vehicle. The display unit 31 is electrically connected to the information processing device 30 so as to display data according to the object detecting operation and/or the travelling assistance operation under control of the information processing device 30. The loudspeaker 32 is electrically connected to the information processing device 30 so as to produce various sounds such as a warning sound according to the object detecting operation and/or the travelling assistance operation under control of the information processing device 30.

As shown in FIG. 2, the information processing device 30 includes an object detecting unit 301, an object information storage unit 302, a travelling assistance unit 303, an object information management unit 304, and an object information selection unit 305 as a functional configuration. Hereinafter, the functional configuration of the information processing device 30 shown in FIG. 2 will be described.

The object detecting unit 301 is provided so as to detect the object B located around the own vehicle, based on the output of the above-described various sensors mounted on the own vehicle. Specifically, the object detecting unit 301 is configured so as to perform the above-described object detecting operation and thereby obtain, as object information, information about the object B detected by the object detecting unit 301.

In the present embodiment, the object information includes position information, image information, object type information, and detection accuracy information, for example. The position information corresponds to the relative position of the object B to the own vehicle and includes the distance measurement information and the azimuth information. The relative position is typically the relative positions of the own vehicle and the object B as viewed in a direction perpendicular to the overall vehicle length direction and the vehicle width direction, and may also be referred to as the "horizontal position". The object type information corresponds to the type of the object B and is obtained based on the output of the LIDAR sensor 23 and the image sensor 24. The "type" includes another vehicle, a pedestrian, a fixed obstacle, a road sign, and a traffic lane, for example. The "fixed obstacle" includes a pillar, a wall, and a step, for example. The detection accuracy information is related to the accuracy of the result of detecting the object B. The result of detecting the object B is referred to simply as "detection accuracy". Details of the detection accuracy will be described later.

The object information storage unit 302 is provided so as to store object information which is the result of detecting by the object detecting unit 301. Specifically, the object information storage unit 302 is an area in the RAM and/or the non-volatile RAM that is secured for storing the object information, and is provided so that the object information can be stored up to a predetermined level of capacity.

In the present embodiment, the object information storage unit 302 is provided so as to store the object information in time series while distinguishing the object information into the current object information and the past object information. The "current object information" corresponds to the object B currently detected, in other words, detected at present. The term "at present" represents a state in which the information processing device 30 is performing each routine (particularly, an object detecting routine) to be described later. The "past object information" corresponds to an object B that is not currently detected, but has been detected in the past. A current stage of execution of each routine to be described later in the case where the information processing device 30 is performing the routine at present is referred to as "this time". The "past" represents an arbitrary point in time earlier than this time when the information processing device 30 performed each routine to be described later.

The travelling assistance unit 303 is provided so as to assist the travelling of the own vehicle based on the object information obtained by the object detecting unit 301. Specifically, in the present embodiment, the travelling assistance unit 303 is configured to receive, from the object information storage unit 302, the object information stored in the object information storage unit 302, and thereby perform the travelling assistance operation. Furthermore, the travelling assistance unit 303 is configured to operate the display unit 31 and/or the loudspeaker 32, as appropriate, in accordance with the travelling assistance operation.

The object information management unit 304 is provided so as to manage the storage state of the object information in the object information storage unit 302. Specifically, in the present embodiment, the object information management unit 304 is configured to receive the related information from the travelling assistance unit 303, determine storage priority based on the related information received, and manage the storage state based on the storage priority determined.

The related information is information related to the travelling assistance operation performed by the travelling assistance unit 303. The related information includes operation type information indicative of the type of the travelling assistance operation and travel mode information indicative of the travel mode of the own vehicle in the travelling assistance operation, for example. The type of the travelling assistance operation will be hereinafter referred to simply as an "operation type". The operation type is, for example, the operation of parking assistance, preventing accidents involving another vehicle or person, or low-speed collision damage reduction braking. Furthermore, the related information includes detection accuracy of the object information, information indicating whether the object information is the current object information or the past object information, and the azimuth of the object B corresponding to the object information, for example. The azimuth of the object B will be hereinafter referred to simply as a "azimuth". The detection accuracy of the object information will be hereinafter referred to simply as "detection accuracy". The type indicating the current object information or the past object information will be hereinafter referred to simply as a "temporal type".

The travel mode includes a drive form and a direction of travel that are included in the travel state. The drive form includes travelling forward, travelling backward, and parking. In other words, the travelling state includes a parking state, that is, a state in which the vehicle speed is 0 km/h. The direction of travel includes straight forward, a right turn, and a left turn. Typically, the travel mode includes a combination of the drive form and the direction of travel such as "travelling forward and turning right". In the case where the operation type is parking assistance, the travel mode includes execution tasks such as searching for a parking space, guiding, parking, and exiting. In this case, typically, the travel mode includes a combination of the travelling state and the execution task such as "reverse parking". The travel mode may also be referred to as a "travelling scene".

In the case where the operation type is parking assistance, the related information includes a parking mode and the positional relationship between the object B corresponding to the object information and a target parking space or a candidate thereof, for example. The parking mode includes parallel parking and perpendicular parking, for example. The positional relationship between the object B corresponding to the object information and the target parking space or the candidate thereof will be hereinafter referred to simply as the "positional relationship". In the case where the object B is used to define the target parking space, in other words, in the case where the object B is adjacent in close proximity to the target parking space, the object B may also be referred to as an "object of interest". Therefore, the positional relationship information may include interest information indicative of a degree of interest in the object B in the assistance operation, in other words, information indicating whether the object B is the object of interest.

The storage priority is the storage priority of the object information to be stored in the object information storage unit 302. In other words, the storage priority is an index indicating the degree of need or the order of priority for memory to be formed or held in the object information storage unit 302. As the storage priority increases, the degree of need or the order of priority for memory to be formed or held in the object information storage unit 302 increases. The storage state includes a distinction between the current object information and the past object information in addition to the presence or absence of memory. Further details of the function of the object information management unit 304 will be described later.

The object information selection unit 305 is provided so as to select the object information to be obtained by the travelling assistance unit 303 for the purpose of the travelling assistance operation. In other words, the object information includes a plurality of object information items about one or more objects detected by the object detecting unit, the object information selection unit 305 is provided so as to select, from the object information items stored in the object information storage unit 302, one of the object information items to be transferred to the travelling assistance unit 303. Specifically, in the present embodiment, the object information selection unit 305 is configured to receive the related information from the travelling assistance unit 303, determine transfer priority of each of the object information items stored in the object information storage unit based on the related information received, and select one of the object information items based on the transfer priority of each of the object information items.

The transfer priority is the priority of the object information in terms of the need of transfer to the travelling assistance unit 303. In other words, the transfer priority is an index indicating the degree of need or the order of priority for transfer in transferring of the object information to the travelling assistance unit 303 so that the travelling assistance unit 303 can perform the travelling assistance operation. As the transfer priority increases, the degree of need or the order of priority for the object information to be transferred to the travelling assistance unit 303 increases. Further details of the function of the object information selection unit 305 will be described later.

(Outline of Operation)

Hereinafter, the outline of the operation of the object detecting device 20 and the information processing device 30 according to the present embodiment will be described along with the advantageous effects produced by the configuration according to the embodiment.

The information processing device 30 obtains the travelling state of the own vehicle based on the output of the vehicle speed sensor 25, the shift position sensor 26, the steering angle sensor 27, the yaw rate sensor 28, and the like. The travelling state also corresponds to the movement state of each of the sonar sensor 21, the millimeter-wave radar sensor 22, the LIDAR sensor 23, and the image sensor 24.

The information processing device 30 determines, based on the obtained travelling state, whether an object detecting condition is satisfied. The object detecting condition is an operation condition for the object detecting device 20. Examples of the "operation condition" include a condition to the effect that the vehicle speed is within a predetermined range and a condition to the effect that the shift position is different from position "P".

The information processing device 30 determines, at a predetermined time interval after the object detecting condition is satisfied, whether the time has reached an object detecting point. When the time reaches the object detecting point, the information processing device 30 performs the object detecting operation. In other words, based on the output of the object detecting sensor mounted on the own vehicle, the object detecting unit 301 detects the object B located around the own vehicle.

Specifically, the information processing device 30 obtains a variety of information included in signals output from the sonar sensor 21, the millimeter-wave radar sensor 22, the LIDAR sensor 23, and the image sensor 24. Subsequently, the object detecting unit 301 obtains or generates the object information based on the variety of information obtained and the travelling state obtained. The object information that is the result of detecting the object B is stored in the object information storage unit 302.

The object information management unit 304 manages the storage state of the object information in the object information storage unit 302. Specifically, the object information management unit 304 stores the object information corresponding to the currently detected object B into the object information storage unit 302 as the current object information. For the object B that is being continuously detected, the object information management unit 304 updates the current object information corresponding to said object B with the latest detecting result, and deletes unnecessary information such as overlapping information. Furthermore, when the object B detected once and thus corresponding to the object information stored as the current object information is not detected any more at present, the object information management unit 304 changes the current object information corresponding to said object B to past object information, and stores the past object information.

The object information management unit 304 checks, against the past object information, the object information corresponding to the object B that failed to be detected the last time, but was detected this time. When the check result shows that there is no past object information that corresponds to the same object B detected this time, the object information management unit 304 determines the object B detected this time as a new object. In this case, the object information management unit 304 stores the corresponding object information into the object information storage unit 302 as current object information.

In contrast, when there is past object information that corresponds to the same object B detected this time, the object information management unit 304 determines this detecting of the object B as a re-detection. In this case, the object information management unit 304 updates the past object information corresponding to the object B detected this time, with the current object information corresponding to the object B detected this time. Specifically, unnecessary information such as information that overlaps with the current detecting result is deleted from the corresponding past object information. The current object information is generated and stored based on the current detecting result and necessary information included in the corresponding past object information.

Furthermore, the object information management unit 304 deletes unnecessary past object information. Specifically, for example, the object information management unit 304 deletes past object information that is no longer necessary as a result of the update with the current object information, as mentioned above. Furthermore, when the own vehicle moves to a different floor in a drive-in parking garage or the like, the object information management unit 304 deletes past object information on the previous floor. Moreover, the object information management unit 304 deletes past object information that has cumulative errors increased due to, for example, driver's quick turning of the steering wheel of the own vehicle or driver's many turnings of the own vehicle. In addition, the object information management unit 304 deletes, as unnecessary information, past object information corresponding to the object B that has continuously failed to be detected for a certain amount of time.

An improvement in the driving assistance function of the vehicle 10 tends to cause a large number and types of object detecting sensors to be mounted on the vehicle 10. Furthermore, these sensors exhibit improved object detecting performance. Therefore, the object information that is stored in the object information storage unit 302 tends to be greater in number and type than in a conventional case.

During travelling assistance operation, in addition to the current object information which is the result of detecting related to the object B that is being currently detected, the past object information which is the past result of detecting related to the object B that is not being currently detected may also be used. However, keeping every past object information stored is not appropriate in terms of storage capacity and processing load. Meanwhile, there is a limit to how much the processing performance improves by just deleting, as mentioned above, information that has become outdated due to update and information that has become unnecessary as a result of continuously failing to be detected.

Thus, in the present embodiment, the object information management unit 304 receives, from the travelling assistance unit 303, the related information that is related to the travelling assistance operation of the travelling assistance unit 303. Furthermore, based on the related information received, the object information management unit 304 determines storage priority of the object information in the object information storage unit 302. Moreover, based on the storage priority determined, the object information management unit 304 manages the storage state of the object information in the object information storage unit 302.

In the present embodiment, the related information includes one of travel mode information indicative of a travel mode of the vehicle in the assistance operation and interest information indicative of a degree of interest in the object in the assistance operation, and the object information management unit 304 determines the storage priority based on the one of the travel mode information and the interest information. The related information further includes one of parking mode information and positional relationship information if the assistance operation is a parking assistance operation of assisting parking of the vehicle, the parking mode information representing a mode of the vehicle to be parked in the parking assistance operation, the positional relationship information representing a positional relationship between the object and one of a target parking space and one or more candidates of the target parking; and the object information management unit 304 determines the storage priority in accordance with the one of the parking mode information and the positional relationship information. Furthermore, the object information management unit 304 determines the storage priority based on the related information, the azimuth, and the detection accuracy.

Figure 3:
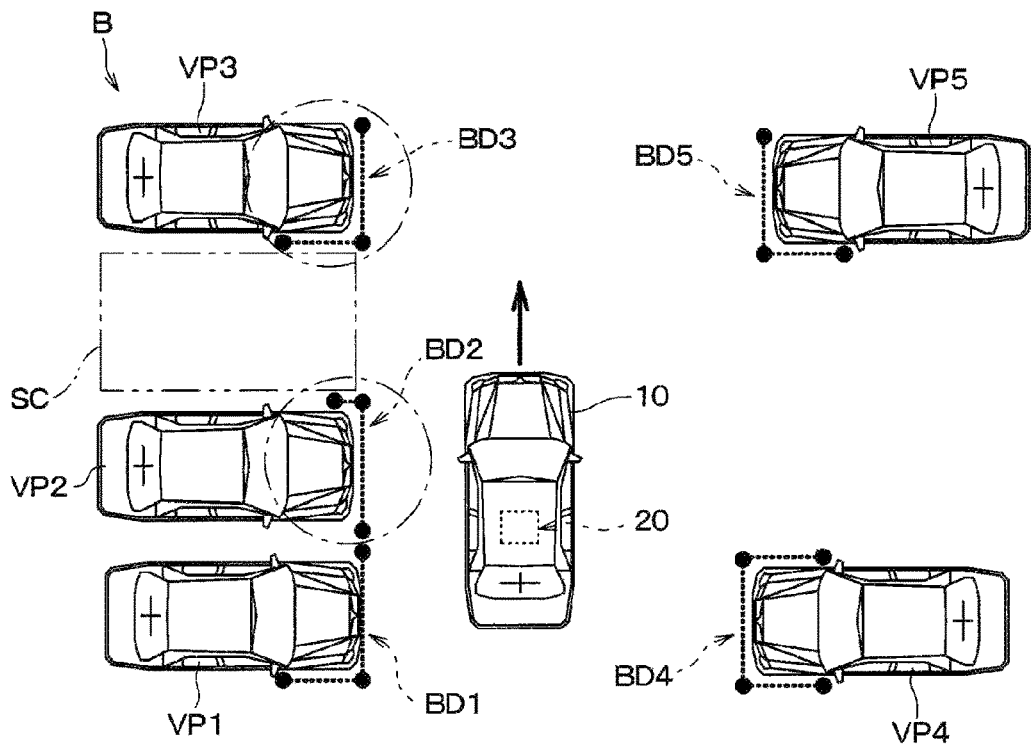
FIG. 3 is a conceptual diagram showing the outline of operation of the information processing device shown in FIG. 2.
Figure 4:
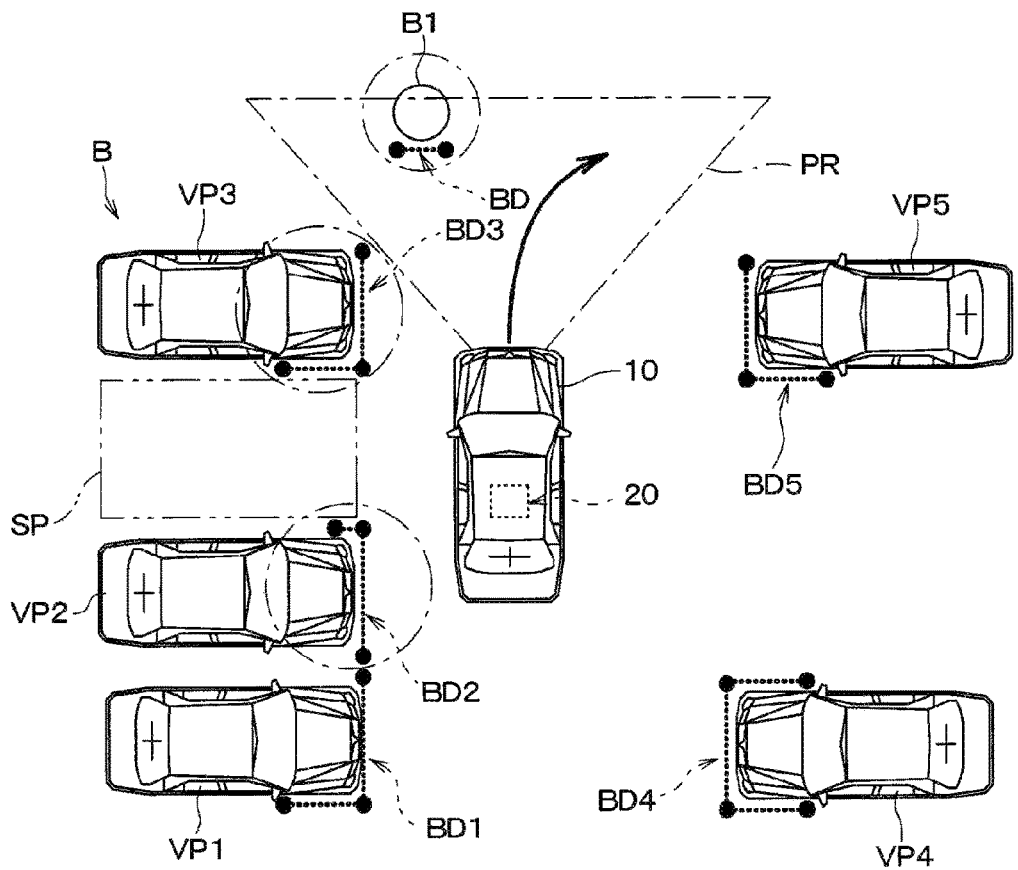
FIG. 4 is a conceptual diagram showing the outline of operation of the information processing device shown in FIG. 2.
Figure 5:
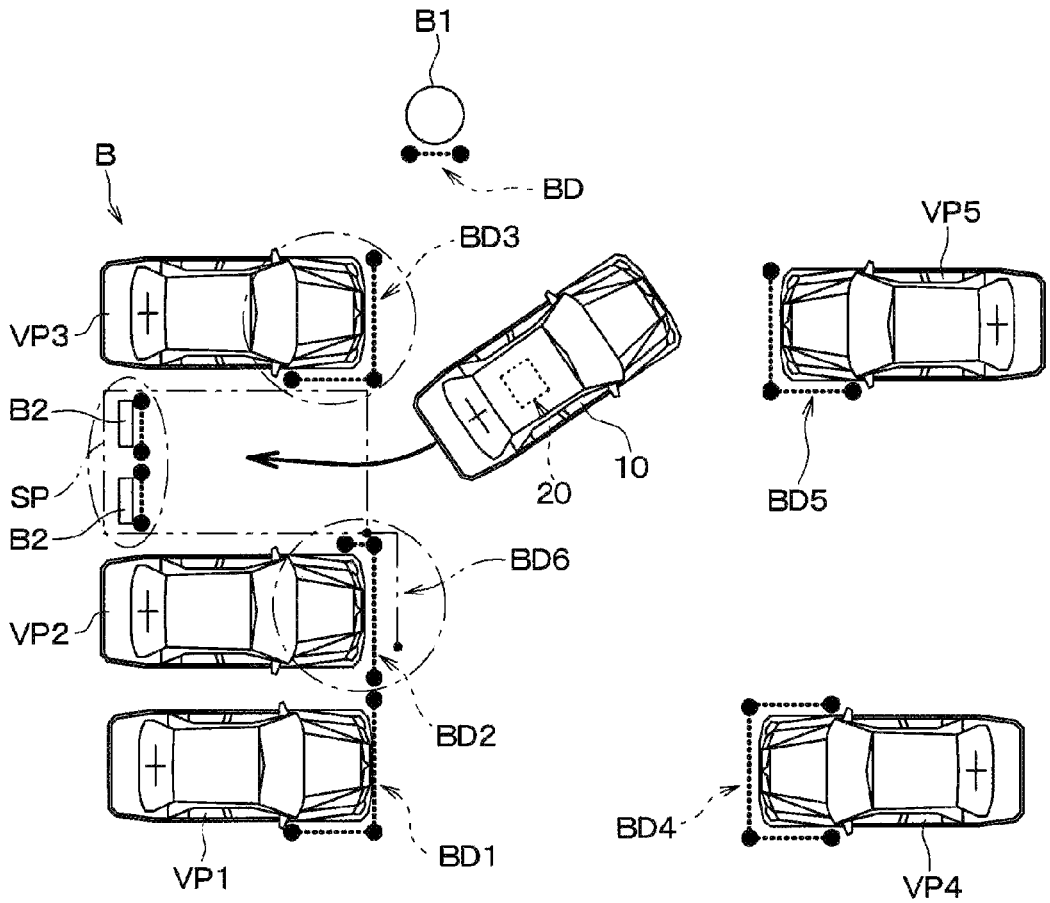
FIG. 5 is a conceptual diagram showing the outline of operation of the information processing device shown in FIG. 2.

FIGS. 3 to 5 show one example of a method for setting the storage priority that depends on the travelling situation, i.e., the travel mode of the own vehicle. Specifically, FIGS. 3 to 5 show a perpendicular parking assistance operation in sequence. In FIGS. 3 to 5, the vehicle 10 is the own vehicle on which the object detecting device 20 is mounted. Reference signs VP1 to VP5 denote other vehicles, in other words, parked vehicles, as the objects B. Reference sign B1 denotes a pole obstacle as the object B. Reference sign B2 denotes a parking block as the object B. Reference sign BD denotes the object information. The object information BD that is given high storage priority is surrounded by a circle or an ellipse drawn with a dash-dot line.

As shown in FIG. 3, in this specific example, on the left-hand side of the own vehicle, a first parked vehicle VP1 to a third parked vehicle VP3 are parked side by side. There is no space available for the own vehicle to park between the first parked vehicle VP1 and the second parked vehicle VP2. However, there is sufficient space available for one vehicle, that is, the own vehicle in this case, to park between the second parked vehicle VP2 and the third parked vehicle VP3. On the right-hand side of the own vehicle, a fourth parked vehicle VP4 to a fifth parked vehicle VP5 are parked side by side. The fourth parked vehicle VP4 and the first parked vehicle VP1 face each other. The fifth parked vehicle VP5 and the third parked vehicle VP3 face each other. Thus, there is space available for two of the own vehicles to park between the fourth parked vehicle VP4 and the fifth parked vehicle VP5. This specific example assumes the case in which a parking space candidate SC is searched for on the left-hand side of the own vehicle and the own vehicle is moved back and perpendicular parked. Reference signs BD1 to BD5 denote object information corresponding to the first parked vehicle VP1 to the fifth parked vehicle VP5.

FIG. 3 shows a situation in which the own vehicle travels straight forward while searching for the parking space candidate SC. The parking space candidate SC is a candidate for the target parking space SP shown in FIG. 4, etc. In such a situation, high storage priority is given to the object information BD2 and the object information BD3 which respectively correspond to the second parked vehicle VP2 and the third parked vehicle VP3 adjacent or proximate to the parking space candidate SC. Stated differently, high storage priority is given to the object information BD corresponding to the object of interest that is used to construct the parking space candidate SC. As the distance from the parking space candidate SC deceases, higher storage priority is given. Thus, in such a situation, the storage priority of the object information BD is determined primarily based on the positional relationship between the object B and the target parking space SP.

After the parking space candidate SC is searched for, the target parking space SP is determined. FIG. 4 shows a situation in which the own vehicle is guided to move forward to the right once in order to achieve reverse parking into the determined target parking space SP in the parking assistance operation. In other words, FIG. 4 shows a situation after the target parking space SP is set to the parking space candidate SC shown in FIG. 3. In such a situation, as in the situation shown in FIG. 3, the storage priority of the object information BD is determined based on the positional relationship between the object B and the target parking space SP. Furthermore, the object information BD corresponding to the pole obstacle B1 which is the object B located in a planned travel region PR for the own vehicle is given high storage priority. Furthermore, as the distance from the center of the planned travel region PR in the vehicle width direction decreases, higher storage priority is given.

After the end of the forward movement guidance, the own vehicle reverses into the target parking space SP. FIG. 5 shows a situation of such reverse parking. Specifically, FIG. 5 shows a situation in which the own vehicle is guided to move forward to the right once in the forward movement guidance stage shown in FIG. 4 and then reverses into the target parking space SP located behind to the left. In such a situation, as in the situation shown in FIG. 3, the storage priority of the object information BD is determined based on the positional relationship between the object B and the target parking space SP.

Furthermore, in the present embodiment, the storage priority of the object information BD is determined based on the detection accuracy. The detection accuracy varies depending on the detecting condition, etc. For example, when triangulation using a pair of sonar sensors 21 is successful, the detection accuracy is high. In contrast, when triangulation is unsuccessful due to a failure to detect direct waves or indirect waves, the detection accuracy is low. As the number of sensors that have detected the object B increases, the detection accuracy increases. The detection accuracy may differ according to the type of a sensor that has detected the object B, depending on the detecting condition including the relative position of the object B to the own vehicle.

Furthermore, both the own vehicle and the object B may move. Therefore, the detection accuracy of the current object information is generally higher than the detection accuracy of the past object information. For the past object information, the detection accuracy decreases as detecting failures continue for a longer period of time.

In view of the foregoing, the object information management unit 304 reduces the storage priority with a decrease in the detection accuracy. Specifically, for example, the storage priority of the current object information is set higher than the storage priority of the past object information. For the past object information, lower storage priority is given as detecting failures continue for a longer period of time.

Furthermore, the storage priority is given according to the type and number of sensors that have detected the object B. Specifically, for example, it is likely that the object B detected by the sonar sensor 21 is located a shorter distance than is the object B detected by other sensors such as the millimeter-wave radar sensor 22. In contrast, the image sensor 24 is capable of capturing an image of a distant area, but a captured image of the object B located at a distance far from the own vehicle is not clear. Therefore, the storage priority for detecting by the sonar sensor 21 is set highest while the storage priority for detecting by the image sensor 24 is set lowest. In other words, the descending order of storage priority is as follows: the sonar sensor 21; the millimeter-wave radar sensor 22; the LIDAR sensor 23; and the image sensor 24. As the number of sensors that have detected the object B increases, higher storage priority is given.

However, for the object information BD corresponding to the object B located in the direction of travel of the own vehicle, the object information management unit 304 curbs the reduction of the storage priority with the decrease in the detection accuracy. Specifically, for example, in the situation shown in FIG. 4, the pole obstacle B1 is located in the planned travel region PR of the own vehicle. Thus, in the case where the object information BD corresponding to the pole obstacle B1 is the past object information, the reduction of the storage priority of said object information BD is curbed. More specifically, even in the case where the object information BD corresponding to the pole obstacle B1 is past object information, said object information BD is handled in substantially the same manner, in terms of the storage priority, as in the case where said object information BD is current object information.

Furthermore, when the same object B is detected at different times, higher storage priority is given to the object information with higher detection accuracy. For example, for the same object B, when the detection accuracy of the past object information obtained using the sonar sensor 21 is higher than the detection accuracy of the current object information obtained using the image sensor 24, higher storage priority is given to the former than to the latter.

Specifically, for example, the object information BD2 corresponding to the second parked vehicle VP2 located in the direction of travel of the own vehicle while reversing in FIG. 5 is obtained by the sonar sensor 21 at the forward movement and search stage shown in FIG. 3. When the own vehicle moves further forward from the position shown in FIG. 3 and passes by the second parked vehicle VP2, the sonar sensor 21 no longer detects the second parked vehicle VP2. Accordingly, the object information BD2 may be classified as past object information. When the object information BD2 is classified as past object information, then the detection accuracy of the object information BD2 decreases upon each of the succeeding consecutive failures to detect the second parked vehicle VP2.

Meanwhile, there are cases where the second parked vehicle VP2 can be detected by the image sensor 24 for rearward capture during the reverse parking shown in FIG. 5. Assume that such a detecting result is object information BD6. The detection accuracy of the object information BD6 is lower than the detection accuracy of the object information BD2 for a predetermined period beginning from the start of detecting. Thus, in such a predetermined period, the object information BD2 that is the past object information is given higher storage priority than the object information BD6 that is the current object information.

The object information management unit 304 manages the storage state of the object information in the object information storage unit 302 based on the storage priority determined. Specifically, for the same object B, at the time of deleting unnecessary information such as overlapping information, the object information management unit 304 deletes information preferentially with lower storage priority. Furthermore, when free storage space for the past object information becomes less than a predetermined amount of space, the object information management unit 304 preferentially deletes the past object information with lower storage priority.

The information processing device 30 determines, based on the obtained travelling state, whether a travelling assistance condition is satisfied. The travelling assistance condition is an execution condition for the travelling assistance operation. When the travelling assistance condition is satisfied while the object detecting condition is satisfied, the information processing device 30 performs travelling assistance operation for the own vehicle in parallel with object detecting operation. In the present embodiment, the information processing device 30 performs the low-speed driving assistance on the own vehicle by the travelling assistance unit 303 based on the obtained travelling state and the obtained object information.

Based on the object information that is the result of detecting by the object detecting unit 301, the travelling assistance unit 303 assists the own vehicle to travel. Specifically, in the present embodiment, the travelling assistance unit 303 receives the object information stored in the object information storage unit 302 and performs the travelling assistance operation on the own vehicle based on the received object information.

An improvement in the travelling assistance function of the vehicle 10 tend to cause a large number and types of object detecting sensors to be mounted on the vehicle 10. Furthermore, these sensors exhibit improved object detecting performance. Therefore, the object information that may be received by the travelling assistance unit 303 at the time of performing the travelling assistance operation tends to be greater in number and type than in a conventional case. However, there is also a limit to how much information can be processed by the information processing device 30 depending on the processing capability and/or processing load of the information processing device 30.

Therefore, the object information selection unit 305 selects one of the object information items to be transferred to the travelling assistance unit 303, from the object information items stored in the object information storage unit 302. Specifically, the object information selection unit 305 determines, based on the related information, transfer priority of each of the object information items stored in the object information storage unit 302. Furthermore, based on the determined transfer priority, the object information selection unit 305 selects one of the object information items to be transferred to the travelling assistance unit 303, from the object information items stored in the object information storage unit 302. Moreover, the object information selection unit 305 transfers the selected object information to the travelling assistance unit 303. The travelling assistance unit 303 performs the travelling assistance operation on the own vehicle based on the received object information.

In the present embodiment, the related information includes one of travel mode information indicative of a travel mode of the vehicle in the assistance operation and interest information indicative of a degree of interest in the one or more objects in the assistance operation; and the object information selection unit 305 determines the transfer priority of each of the object information items based on the one of the travel mode information and the interest information. The related information further includes one of parking mode information and positional relationship information if the assistance operation is a parking assistance operation of assisting parking of the vehicle, the parking mode information representing a mode of the vehicle to be parked in the parking assistance operation, the positional relationship information representing a positional relationship between the one or more objects and one of a target parking space and one or more candidates of the target parking; and the object information selection unit 305 determines the transfer priority in accordance with the one of the parking mode information and the positional relationship information. Furthermore, the object information selection unit 305 determines transfer priority of each of the object information items based on the related information, the azimuth, and the detection accuracy.

The object information selection unit 305 reduces the transfer priority with a decrease in the detection accuracy. However, for the object information corresponding to the object located in the direction of travel of the own vehicle, the object information selection unit 305 curbs the reduction of the transfer priority with the decrease in the detection accuracy.

As described above, in the present embodiment, the storage priority and the transfer priority are determined by substantially the same method. Therefore, in the following description, the storage priority and the transfer priority may be collectively referred to as "object priority".

Table 1 below shows an example of elements that are given high object priority. A specific example of determining, in other words, calculating, the object priority will be described later. In Table 1, the element "Type 1" in the column "operation type" corresponds to the parking assistance operation. The element "Type 2" corresponds to the operation of preventing turn accidents involving another vehicle or person. The element "Type 3" corresponds to the low-speed collision damage reduction braking.

TABLE 1

| Operation type | Travel mode | Azimuth Front/ Back | Azimuth Left/ Right | Priority region | Accuracy | Current/ Past |
|---|---|---|---|---|---|---|
| Type 1 | During forward movement and search | Front | — | Parking space candidate | High | Currently detected |
| | Forward movement guidance for perpendicular parking | Front | — | Target parking space | High | Currently detected |
| | Reverse perpendicular parking | Back | — | Target parking space | High | Currently detected |
| | Reverse parallel parking | Back | — | Target parking space | High | Currently detected |
| | Forward perpendicular parking | Front | — | Target parking space | High | Currently detected |
| | Reverse exiting from perpendicular parking space | Back | — | — | High | Currently detected |
| | Forward exiting from parallel parking space | Front | — | — | High | Currently detected |
| Type 2 | Move forward and turn right | Front | Right | — | High | Currently detected |
| | Move forward and turn left | Front | Left | — | High | Currently detected |
| | Move back and turn right | Back | Right | — | High | Currently detected |
| | Move back and turn left | Back | Left | — | High | Currently detected |
| Type 3 | Move straight forward | Front | — | — | High | Currently detected |
| | Move forward and turn right | Front | Right | — | High | Currently detected |
| | Move forward and turn left | Front | Left | — | High | Currently detected |
| | Move straight back | Back | — | — | High | Currently detected |
| | Move back and turn right | Back | Right | — | High | Currently detected |
| | Move back and turn left | Back | Left | — | High | Currently detected |

As described above, in the configuration and the method according to the present embodiment, as object information, information about the object B detected by the object detecting unit is stored in the object information storage unit 302. The storage state of the object information in the object information storage unit 302 is managed based on the storage priority. The storage priority is determined based on the related information received from the travelling assistance unit 303 and related to the travelling assistance operation of the travelling assistance unit 303.

In this manner, with the configuration and the method according to the present embodiment, the storage state of the object information in the object information storage unit 302 is managed based on the related information which is related to the travelling assistance operation of the travelling assistance unit 303. This enables better management of the storage state of the result of detecting the object B.

Furthermore, in the configuration and the method according to the present embodiment, the object information to be transferred to the travelling assistance unit 303 is selected based on the transfer priority. The transfer priority is determined based on the related information received from the travelling assistance unit 303 and related to the travelling assistance operation of the travelling assistance unit 303.

In this manner, with the configuration and the method according to the present embodiment, the object information to be transferred to the travelling assistance unit 303 is selected based on the related information which is related to the travelling assistance operation of the travelling assistance unit 303. Therefore, the minimum necessary object information can be transferred to the travelling assistance unit 303. This makes it possible to perform a high-performance travelling assistance operation while appropriately curbing an excessive increase in the processing load on the information processing device 30.

(Operation Example)

Hereinafter, a specific operation example corresponding to the above-described outline of operation with the configuration according to the present embodiment will be described with reference to the flowchart shown in FIG. 4. Note that in the drawings, "Step" is abbreviated simply as "S".

(Object Detecting)

Figure 6:
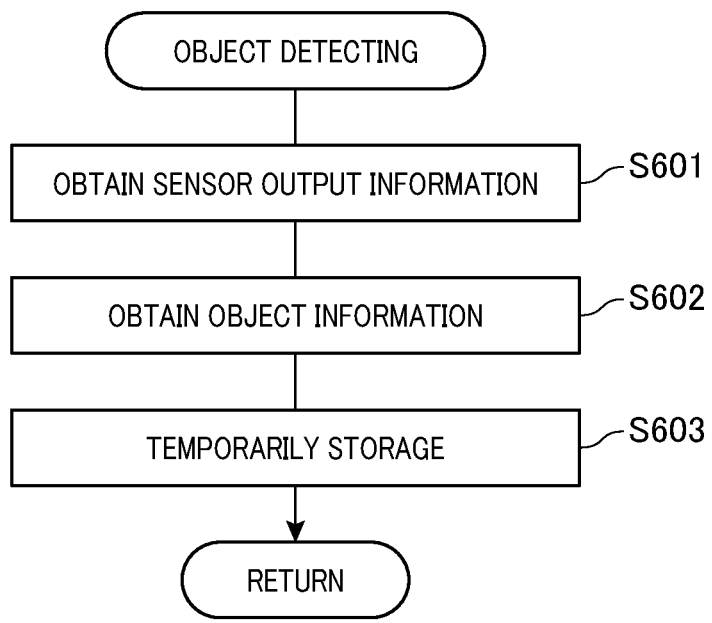
FIG. 6 is a flowchart showing one operation example of the information processing device shown in FIG. 2.

The CPU of the information processing device 30 repeats the object detecting routine shown in FIG. 6 every time the object detecting timing reaches. In other words, at a predetermined time interval, the CPU repeatedly starts the object detecting routine shown in FIG. 6 while the object detecting condition is satisfied.

When this routine is started, first, in step S601, the CPU obtains a variety of information included in the output signals received from various sensors. Next, in step S602, the CPU obtains the object information based on the variety of information obtained in step S601. In other words, the CPU detects the object B based on the output of the various sensors. Subsequently, in step S603, the CPU temporarily stores the current object information obtainment result into the RAM. The CPU then temporarily terminates the present routine.

(Object Information Management)

Figure 7A:
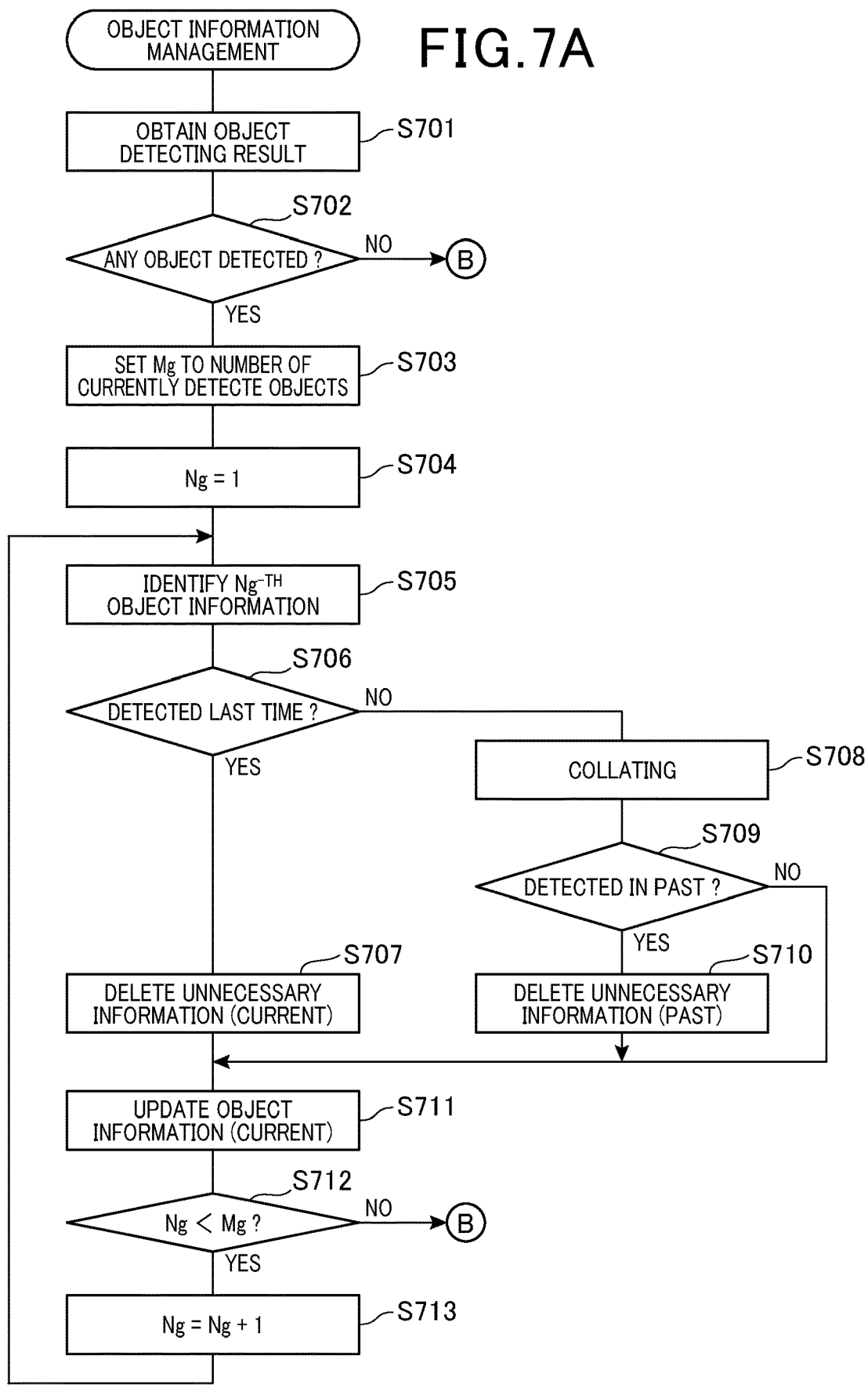
FIG. 7A is a flowchart showing one operation example of the information processing device shown in FIG. 2.
Figure 7B:
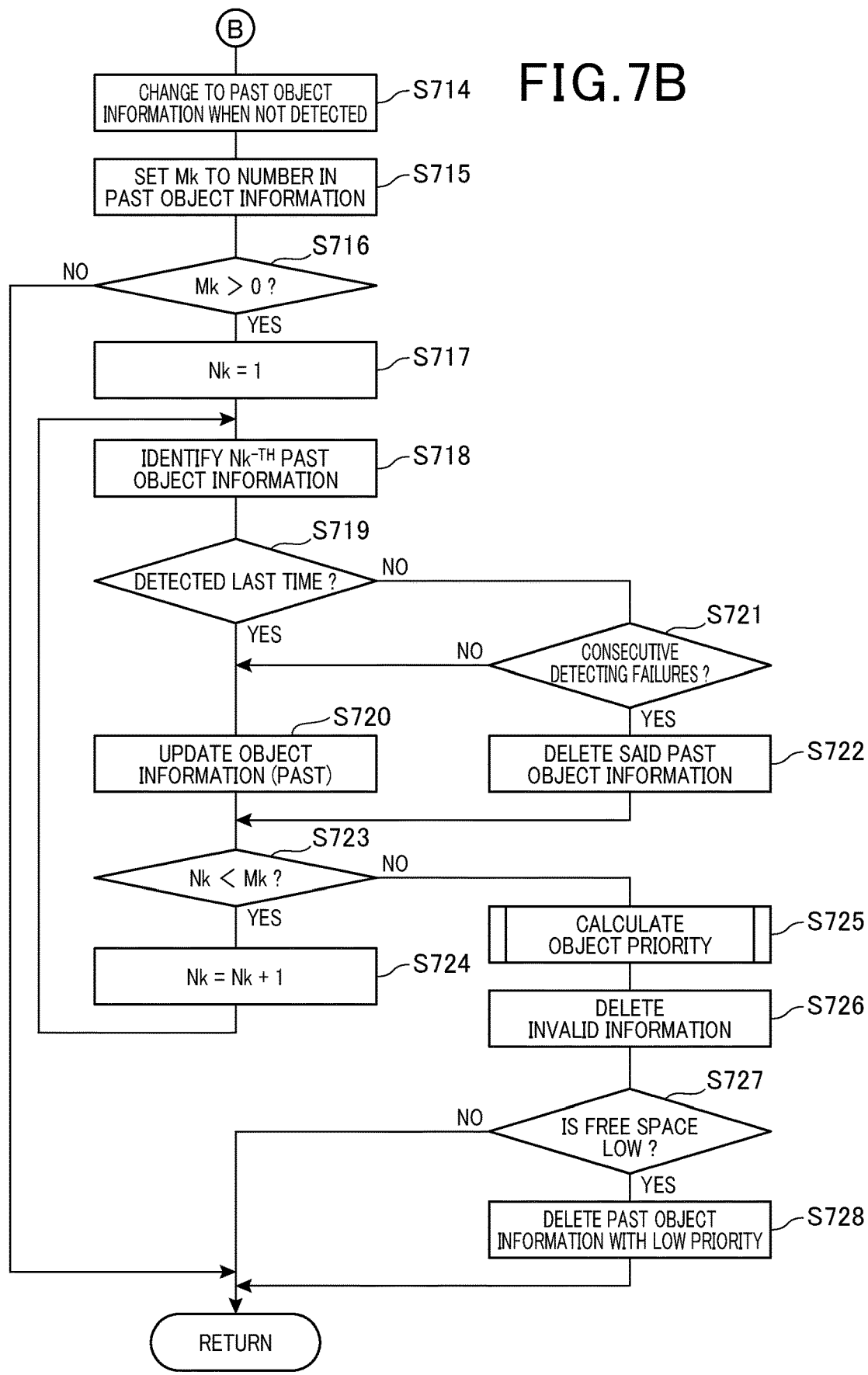
FIG. 7B is a flowchart showing one operation example of the information processing device shown in FIG. 2.

FIGS. 7A and 7B show an object information management routine corresponding to the operation of the object information management unit 304. The object information management routine is performed by the CPU immediately after the object detecting routine shown in FIG. 6 is performed.

When this routine is started, first, in step S701, the CPU obtains the object detecting result of this time, that is, the execution result of the above-described object detecting routine performed immediately before execution of this routine. This execution result is typically the result of the obtained current object information temporarily stored in the RAM in step S603 mentioned above. Note that when the object B is not detected at the time of execution of the above-described object detecting routine, an execution result indicating the failure to detect the object B is obtained in step S701.

Next, in step S702, the CPU determines whether the object B has been detected as the current object detecting result. When the object B has been detected as the current object detecting result (that is, YES in Step 702), the CPU sequentially performs processes in steps S703, S704.

In step S703, the CPU sets the value of Mg to the number of objects B detected this time, the object B detected this time means the object B detected as the object detecting result of this time and will be hereinafter referred to as a "currently detected object". In step S704, the CPU initializes the value of a counter Ng to 1. After the process in step S704, the CPU proceeds to step S705.

In step S705, the CPU identifies object information corresponding to the $Ng^{-th}$ currently detected object, in such a manner as to avoid overlap. As the identification method, a temporal sequence is used, for example. Specifically, the object information corresponding to the $Ng^{-th}$ currently detected object is the $Ng^{-th}$ object information in the chronological order in which the object information is stored, in the object information corresponding to Mg currently detected objects, for example. In the case where the process in step S705 is performed immediately after the process in step S704, the CPU identifies the object information corresponding to the first currently detected object. After the process in step S705, the CPU proceeds to step S706. In step S706, the CPU determines whether the $Ng^{-th}$ currently detected object was detected the last time.

When the $Ng^{-th}$ currently detected object was detected the last time (that is, YES in step S706), the CPU proceeds to step S707. In step S707, for the current object information corresponding to the $Ng^{-th}$ currently detected object, the CPU deletes unnecessary information such as overlapping information. Subsequently, the CPU proceeds to step S711. In step S711, the CPU updates the current object information corresponding to the $Ng^{-th}$ currently detected object, with the object information identified in step S705.

When the $Ng^{-th}$ currently detected object was not detected the last time (that is, NO in step S706), the CPU proceeds to steps S708, S709. In step S708, the CPU collates the object information corresponding to the $Ng^{-th}$ currently detected object with the past object information stored in the object information storage unit 302. In step S709, as a result of collating in step S708, the CPU determines whether there is the past object information corresponding to the $Ng^{-th}$ currently detected object. Specifically, the CPU determines whether the $Ng^{-th}$ currently detected object was detected at any time before the time before the time before the current time, and the past detecting result has been stored in the past object information.

When there is past object information corresponding to the $Ng^{-th}$ currently detected object (that is, YES in step S709), the CPU proceeds to step S710. In step S710, the CPU deletes unnecessary past object information. Subsequently, the CPU proceeds to step S711. In step S711, the CPU updates the current object information corresponding to the $Ng^{-th}$ currently detected object, with the object information identified in step S705.

When there is no past object information corresponding to the $Ng^{-th}$ currently detected object (that is, NO in step S709), said currently detected object is a newly detected object. Thus, in this case, the CPU skips the process in step S710 and proceeds to step S711. In step S711, the CPU updates the current object information corresponding to the $Ng^{-th}$ currently detected object, with the object information identified in step S705. This means that in this case, the object information identified in step S705 is newly stored in the object information storage unit 302 as the current object information.

After the process in step S711, the CPU proceeds to step S712. In step S712, the CPU determines whether the value of the counter Ng is less than Mg. In other words, the CPU determines whether the value of the counter Ng has reached Mg. When the value of the counter Ng has not reached Mg (that is, YES in step S712), some of the currently detected objects in the current object detecting result have not yet been identified in step S705, in other words, not yet been subject to the object information management process. Thus, in this case, the CPU increments the value of the counter Ng in step S713 and then processing returns to step S705.

When the object B has not been detected as the current object detecting result (that is, NO in step S702), the CPU proceeds to step S714 shown in FIG. 7B. Also when the value of the counter Ng reaches Mg (that is, NO in step S712), the CPU proceeds to step S714 shown in FIG. 7B.

In step S714, the CPU changes the current object information stored in the object information storage unit 302 and corresponding to a previously detected object into the past object information. The previously detected object is the object B that has not been currently detected, in other words, not detected this time, but has been detected in the past. After the process in step S714, the CPU proceeds to step S715.

In step S715, the CPU sets the value of Mk to the number of previously detected objects corresponding to the past object information stored in the object information storage unit 302. After the process in step S715, the CPU proceeds to step S716.

In step S716, the CPU determines whether Mk is greater than zero. In other words, the CPU determines whether there is a previously detected object corresponding to the past object information stored in the object information storage unit 302. When there is a previously detected object corresponding to the past object information stored in the object information storage unit 302 (that is, YES in step S716), the CPU proceeds to step S717. On the other hand, when there is no previously detected object corresponding to the past object information stored in the object information storage unit 302, Mk is zero. In this case (that is, NO in step S716), the CPU temporarily terminates the present routine.

In step S717, the CPU initializes the value of a counter Nk to 1. After the process in step S717, the CPU proceeds to step S718.

In step S718, the CPU identifies past object information corresponding to the $Nk^{-th}$ previously detected object, in such a manner as to avoid overlap. As the identification method, a temporal sequence is used, for example, as in the above example. In the case where the process in step S718 is performed immediately after the process in step S717, the CPU identifies the past object information corresponding to the first previously detected object. After the process in step S718, the CPU proceeds to step S719. In step S719, the CPU determines whether the $Nk^{-th}$ previously detected object was detected the last time.

When the $Nk^{-th}$ previously detected object was detected the last time (that is, YES in step S719), the CPU proceeds to step S720. In step S720, based on the object detecting result of this time, the CPU updates the past object information corresponding to the $Nk^{-th}$ previously detected object. Specifically, for example, the CPU updates the number of consecutive detecting failures, the detection accuracy information, etc. After the process in step S720, the CPU proceeds to step S723.

When the $Nk^{-th}$ previously detected object was not detected the last time (that is, NO in step S719), the CPU proceeds to step S721. In step S721, the CPU determines whether the number of consecutive detecting failures has reached a predetermined maximum number due to the current detecting failure.

When the number of consecutive detecting failures has not reached the maximum number (that is, NO in step S721), the CPU proceeds to step S720. In step S720, based on the object detecting result of this time, the CPU updates the past object information corresponding to the $Nk^{-th}$ previously detected object. Specifically, for example, the CPU updates the number of consecutive detecting failures, the detection accuracy information, etc. After the process in step S720, the CPU proceeds to step S723.

When the predetermined maximum number of consecutive detecting failures occur (that is, YES in step S721), the CPU proceeds to step S722. In step S722, the CPU deletes the past object information corresponding to the $Nk^{-th}$ previously detected object. After the process in step S722, the CPU proceeds to step S723.

In step S723, the CPU determines whether the value of the counter Nk is less than Mk. In other words, the CPU determines whether the value of the counter Nk has reached Mk. When the value of the counter Nk has not reached Mk (that is, YES in step S723), some of the past object information has not yet been identified in step S718, in other words, not yet been subject to the object information management process. Thus, in this case, the CPU increments the value of the counter Nk in step S724 and then processing returns to step S718. On the other hand, when the value of the counter Nk reaches Mk (that is, NO in step S723), the CPU proceeds to steps S725, S726.

In step S725, the CPU calculates the object priority, specifically, the storage priority. Calculation of the object priority will be described later. In step S726, the CPU deletes invalid object information. The invalid object information is, for example, past object information on a previous floor when moving to a different floor in a drive-in parking garage or the like. Alternatively, the invalid object information is, for example, past object information that has cumulative errors increased due to, for example, driver's quick turning of the steering wheel of the own vehicle or driver's many turnings of the own vehicle. After the process in step S726, the CPU proceeds to step S727.

In step S727, the CPU determines whether the free storage space of the object information storage unit 302 that corresponds to the past object information has become less than the predetermined amount of space. When the free space becomes less than the predetermined amount of space (that is, YES in step S727), the CPU temporarily terminates the present routine after the process in step S728 is performed. In step S728, the CPU deletes a predetermined amount of the past object information with low storage priority that corresponds to the current free space. When the free space is greater than or equal to the predetermined amount of space (that is, NO in step S727), the CPU skips the processing in Step 728 and temporarily terminates the present routine.
(Object Information Selection)

Figure 8:
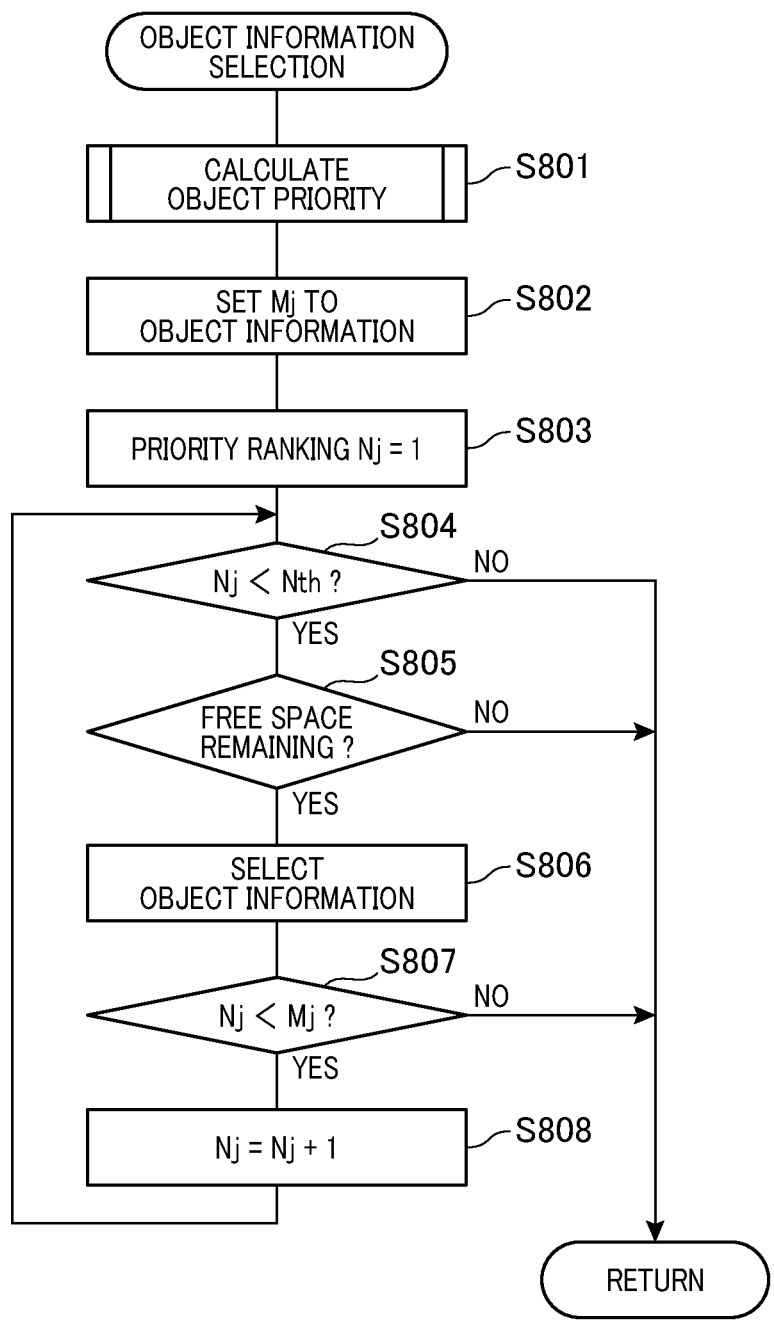
FIG. 8 is a flowchart showing one operation example of the information processing device shown in FIG. 2.

FIG. 8 shows an object information selection routine corresponding to the operation of the object information selection unit 305. The CPU performs the object information selection routine with appropriate timing at the time of execution of the travelling assistance operation by the travelling assistance unit 303.

When this routine is started, first, in step S801, the CPU calculates the object priority, specifically, the transfer priority. Calculation of the object priority will be described later. Next, in step S802, the CPU sets the value of Mj to the total number of the object information items stored in the object information storage unit 302. This means that Mj is the total value of the number of the current object information items stored in the object information storage unit 302 and the number of the past object information items stored in the object information storage unit 302.

Subsequently, in step S803, the CPU initializes the value of a priority ranking counter Nj to 1. In this specific example, Assume that the transfer priority increases as the value of the priority ranking counter Nj decreases. Specifically, the object information ranked first in the priority ranking is the object information with the highest transfer priority. The object information ranked in $Nj^{-th}$ place in the priority ranking is the object information with the $Nj^{-th}$ highest transfer priority. Subsequently, the CPU proceeds to step S804.

In Step 804, the CPU determines whether Nj is less than a threshold value Nth. In other words, the CPU determines whether the priority given to the object information ranked in $Nj^{th}$ place in the priority ranking is greater than or equal to predetermined priority. In the case where the process in step S804 is performed immediately after the process in step S803, Nj is 1. Thus, in this case, the result of determination in step S804 is "YES".

When the priority given to the object information ranked in $Nj^{th}$ place in the priority ranking is greater than or equal to the predetermined priority (that is, YES in step S804), the CPU proceeds to step S805. On the other hand, when the priority given to the object information ranked in $Nj^{-th}$ place in the priority ranking is not greater than or equal to the predetermined priority (that is, NO in step S804), the CPU skips the process in step S805 and temporarily terminates the present routine.

In step S805, the CPU determines whether there is any free space in a temporary storage area for the object information to be transferred to the travelling assistance unit 303. In other words, the CPU determines whether the total amount of the object information selected to be transferred to the travelling assistance unit 303 has reached a predetermined upper limit. When there is some space left (that is, YES in step S805), the CPU proceeds to step S806. On the other hand, when there is no space left, (that is, NO in step S805), the CPU skips the process in step S806 and temporarily terminates the present routine.

In step S806, the CPU selects the object information ranked in Nj-th place in the priority ranking in order to transfer the object information to the travelling assistance unit 303. In other words, the CPU stores the object information ranked in Nj-th place in the priority ranking into the aforementioned temporary storage area provided in the RAM. Subsequently, the CPU proceeds to step S807.

In step S807, the CPU determines whether the value of the priority ranking counter Nj is less than Mj. In other words, the CPU determines whether all of the object information items stored in the object information storage unit 302 has already been processed in the present routine. When there is any object information that has not been processed yet (that is, YES in step S807), the CPU increments the value of the counter Nj in step S808 and then proceeds back to step S804.

On the other hand, when all of the object information items stored in the object information storage unit 302 has already been processed in the present routine (that is, NO in step S807), the CPU temporarily terminates the present routine.

In this manner, the CPU selects the object information and stores the object information into the aforementioned temporary storage area provided in the RAM until one of the following conditions is satisfied:

every object information with at least the predetermined priority has been selected (that is, NO in step S804);

the total amount of the object information items selected to be transferred to the travelling assistance unit 303 reaches the predetermined upper limit (that is, NO in step S805); and the selection process on all of the object information items stored in the object information storage unit 302 is completed (that is, NO in step S807).

(Object Priority Calculation)

Hereinafter, one example of the object priority calculation process corresponding to step S725 shown in FIG. 7B and step S801 shown in FIG. 8 will be described with reference to the flowchart shown in FIG. 9.

First, in steps S901-S904, the CPU obtains information that includes the related information and is necessary to calculate, in other words, determine, the object priority. Specifically, in step S901, the CPU obtains, from the travelling assistance unit 303, operation type information on the travelling assistance operation that is being currently performed. In step S902, the CPU obtains, from the travelling assistance unit 303, travel mode information on the travelling assistance operation that is being currently performed.

In step S903, the CPU obtains, from the travelling assistance unit 303, a priority region in the travelling assistance operation that is being currently performed. The "priority region" is a region that has the advantageous effect of increasing priority for the object B located therein or adjacent thereto. For example, the parking space candidate SC, the target parking space SP, and the planned travel region PR are each the "priority region". In step S904, the CPU obtains a priority azimuth in the travelling assistance operation that is being currently performed. The "priority azimuth" is an azimuth in which the object of interest is likely to be present. For example, the current and planned directions of travel of the own vehicle are each the "priority azimuth".

After the process in step S904, the CPU proceeds to steps S905, S906. In step S905, the CPU extracts valid object information from all of the object information items stored in the object information storage unit 302. The "valid object information" has a meaning opposite to the meaning of the "invalid object information" in step S726. Specifically, the "valid object information" is information that remains after the "invalid object information" in step S726 is extracted from all of the object information items stored in the object information storage unit 302. In step S906, the CPU sets the value of My to the total number of the valid object information items extracted in step S905. Subsequently, the CPU proceeds to step S907.

In step S907, the CPU determines whether the value of My exceeds zero. In other words, the CPU determines whether all of the object information stored in the object information items storage unit 302 includes at least one piece of valid object information.

When the value of My exceeds zero (that is, YES in step S907), all of the object information items stored in the object information storage unit 302 includes at least one valid object information item. Thus, in this case, the CPU proceeds to step S908 and subsequent steps. In contrast, when the value of My does not exceed zero (that is, NO in step S907), all of the object information items stored in the object information storage unit 302 includes no valid object information (that is, My is zero). Thus, in this case, the CPU temporarily terminates the present routine.

In step S908, the CPU initializes the value of a priority processing counter Ny to 1. After the process in step S908, the CPU sequentially performs the processes in steps S909-S916.

In step S909, the CPU identifies the Ny$^{-th}$ object information in all of the object information items stored in the object information storage unit 302, in such a manner as not to cause overlap. As the identification method, a temporal sequence is used, for example, as in the above example.

In step S910, for the Ny$^{-th}$ object information, the CPU determines priority Y1 based on the positional relationship information. In this specific example, the priority Y1 is determined so that as the value thereof increases, the storage priority or the transfer priority increases.

The priority Y1 is determined based on the positional relationship between the object B corresponding to the object information and the priority region. Furthermore, the priority Y1 is determined also based on whether the object B corresponding to the object information is an object of interest. Specifically, for example, when the object B corresponding to the object information is an object of interest, the priority Y1 is set to a predetermined value (for example, 1). Furthermore, when the object B corresponding to the object information is not an object of interest, the priority Y1 is determined based on the positional relationship (for example, the distance) between the object B corresponding to the object information and the priority region, and the map or the lookup table. The map or the lookup table can be created based on the result of computer simulation and/or various experiments.

In step S911, for the Ny$^{-th}$ object information, the CPU determines priority Y2 based on the azimuth information. In this specific example, the priority Y2 is determined so that as the value thereof increases, the storage priority or the transfer priority increases.

The priority Y2 is determined based on the relationship between a priority azimuth Or and a azimuth θ of the object B corresponding to the object information. Specifically, for example, when θt=θ−θr, the priority Y2 is determined based on θt and the map or the lookup table. The map or the lookup table can be created based on the result of computer simulation and/or various experiments.

In step S912, for the Ny$^{-th}$ object information, the CPU determines a correction value Y3 based on the type indicating the current object information or the past object information. In this specific example, the correction value Y3 is determined so that as the value thereof increases, the storage priority or the transfer priority increases. For example, the correction value Y3 is a predetermined value α when said object information is the current object information, and is a predetermined value β when said object information is the past object information. In this case, 0<β<α≤1.

In step S913, for the Ny$^{-th}$ object information, the CPU determines a correction value Y4 based on the detection accuracy. In this specific example, the correction value Y4 is determined so that as the value thereof increases, the storage priority or the transfer priority increases. For example, the correction value Y4 is defined as follows using detection accuracy Ac: Y4=Kc·Ac where 0<Ac≤1. Here, Kc is a predetermined coefficient and satisfies the relationship 0<Kc≤1.

In step S914, the CPU calculates object priority Y based on the priority Y1 or the like determined in steps S910-S913.

Specifically, for example, the object priority Y is calculated based on the priority Y1 based on the positional relationship information, the priority Y2 based on the azimuth information, the correction value Y3 based on the type indicating the current object information or the past object information, the correction value Y4 based on the detection accuracy, and a predetermined calculation method. The predetermined calculation method can be created based on the result of computer simulation and/or various experiments.

In step S915, the CPU stores the calculated value of the object priority Y for the Ny$^{-th}$ object information into the object information storage unit 302 in association with said object information. In step S916, the CPU determines whether the value of the counter Ny is less than My. In other words, the CPU determines whether calculation of the current object priority Y has been completed for all of the valid object information items stored in the object information storage unit 302.

When there is valid object information for which calculation of the object priority Y has not yet been completed (that is, YES in step S916), the CPU increments the value of the counter Ny in step S917 and then processing returns to step S909. On the other hand, when the calculation of the current object priority Y has been completed (that is, NO in step S916), the CPU temporarily terminates the present routine.

(Modification)

The present disclosure is not limited to the above embodiment. Therefore, the above embodiment can be changed, as appropriate. Representative modifications will be described below. In the following description of the modifications, differences from the above embodiment will be mainly described. In the above embodiment and the modification, the same or equivalent portions are assigned the same reference signs. Thus, in the following description of the modifications, the preceding description in the above embodiment can be applied, as appropriate, to a structural element having the same reference sign as that in the above embodiment unless there is a technical inconsistency or any additional description is given.

The present disclosure is not limited to the specific device configuration described in the above embodiment. In other words, for example, the vehicle 10 on which the object detecting device 20 is mounted is not limited to a four-wheel vehicle. Specifically, the vehicle 10 may be a three-wheel vehicle or may be a six-wheel or eight-wheel vehicle such as a cargo truck.

The type of the vehicle 10 may be an automobile including an internal combustion engine alone or may be an electric vehicle or a fuel cell electric vehicle including no internal combustion engine or may be what is called a hybrid vehicle. The shape and the structure of the vehicle body 11 are likewise not limited to the shape of a box, that is, a substantially rectangular shape in a plan view. Furthermore, no particular limitation is imposed on the number of door panels 14.

There is also no particular limit to a subject to which the object detecting device 20 is applied. Specifically, for example, the object detecting device 20 can be favorably applied even to semi-self-driving or self-driving systems equivalent to levels 2-5 in the definition of autonomous driving.

The positioning and the number of sonar sensors 21 are not limited to those in the above specific example. Specifically, for example, referring to FIG. 1, when the third front sonar 211C is disposed at the center position in the vehicle width direction, the fourth front sonar 211D is omitted.

Similarly, when the third rear sonar 212C is disposed at the center position in the vehicle width direction, the fourth rear sonar 212D is omitted. The first side sonar 213A to the fourth side sonar 213D may be omitted.

The number, positioning, and detecting directions of millimeter-wave radar sensor 22 are not limited to those in the above specific example. The same also applies to the LIDAR sensor 23 and the image sensor 24.

The types and the number of various sensors are not limited to those in the above specific example. Specifically, for example, an acceleration sensor not shown in the drawings may be used as the travelling state detecting sensor.

In the above embodiment, the information processing device 30 is configured as an in-vehicle microcomputer that starts by the CPU reading a program from a ROM or the like. However, the present disclosure is not limited to this configuration. Specifically, for example, the information processing device 30 may be a digital circuit configured to be able to perform the above-described operations, for example, an ASIC or a FPGA such as a gate array. The ASIC stands for an application specific integrated circuit. The FPGA stands for a field programmable gate array.

The present disclosure is not limited to the specific functional configuration described in the above embodiment. For example, the functional block configuration shown in FIG. 2 is a mere example provided for the sake of convenience in order to briefly explain one embodiment of the present disclosure. Thus, the present disclosure is not limited to this functional block configuration. This means that the functions and positioning may be changed, as appropriate, from those in the one specific example shown in FIG. 2.

The travelling assistance unit 303 may be provided as a unit separate from the information processing device 30. Specifically, for example, the travelling assistance unit 303 may be a travelling assistance ECU electrically connected to the information processing device 30 via an in-vehicle communication line.

The information to be used by the travelling assistance unit 303 in the travelling assistance operation is not limited to that read from the object information storage unit 302. In other words, a portion of the information items to be used by the travelling assistance unit 303 in the travelling assistance operation may be obtained from the object detecting unit 301 and/or various sensors.

The object information selection unit 305 can be evaluated as a unit that reads, from the object information items stored in the object information storage unit 302, object information required to be transferred to the travelling assistance unit 303. Therefore, the object information selection unit 305 may also be referred to as an "object information reading unit 305".

The present disclosure is not limited to the specific operation examples described in the above embodiment. Specifically, for example, elements for determining storage priority are not limited to those in the above specific example. This means that, for example, one or both of the azimuth and the detection accuracy may be omitted. The same also applies to the transfer priority. Furthermore, the storage priority and the transfer priority may be determined in different methods.

The object of interest is not limited to the object B used to define the target parking space or a candidate thereof. Specifically, for example, the object of interest may be an object B that is drawing attention or is being considered as an object that may collide with the own vehicle in the collision avoidance operation, the operation of preventing turn accidents involving another vehicle or person, and the low-speed collision damage reduction braking operation, and so on. Alternatively, for example, the object of interest may be an object B used to calculate a travel path.

The storage priority may be determined based on one of the travel mode information and the interest information indicative of a degree of interest in the object B in the assistance operation. The same applies to the transfer priority as well.

In Step 714, the CPU may change, into the past object information, the current object information stored in the object information storage unit 302 and corresponding to the object B that has continuously failed to be detected at least predetermined number of times. In other words, the previously detected object may be the object B that has continuously failed to be detected at least predetermined number of times as the current object detecting result, but has been detected in the past.

In Step 720, for the $Nk^{-th}$ previously detected object, the CPU may update the position information using the current position estimation result estimated based on the corresponding past object information.

The process in Step 726 may be omitted. Alternatively, the process in Step 726 may be performed immediately after the process in Step 727. In this case, a process that is substantially the same as that in Step 727 may be performed again immediately before the process in Step 728.

The priority ranking counter Nj in FIG. 8 may be set so that as the value thereof increases, the transfer priority increases. In this case, Mj is set to the initial value of Nj which is set in Step 803. Furthermore, incrementing in Step 808 (that is, adding 1) is changed into decrementing (that is, subtracting 1). Furthermore, the content of the determination in Step 807 is changed into "Nj>1?".

Figure 9:
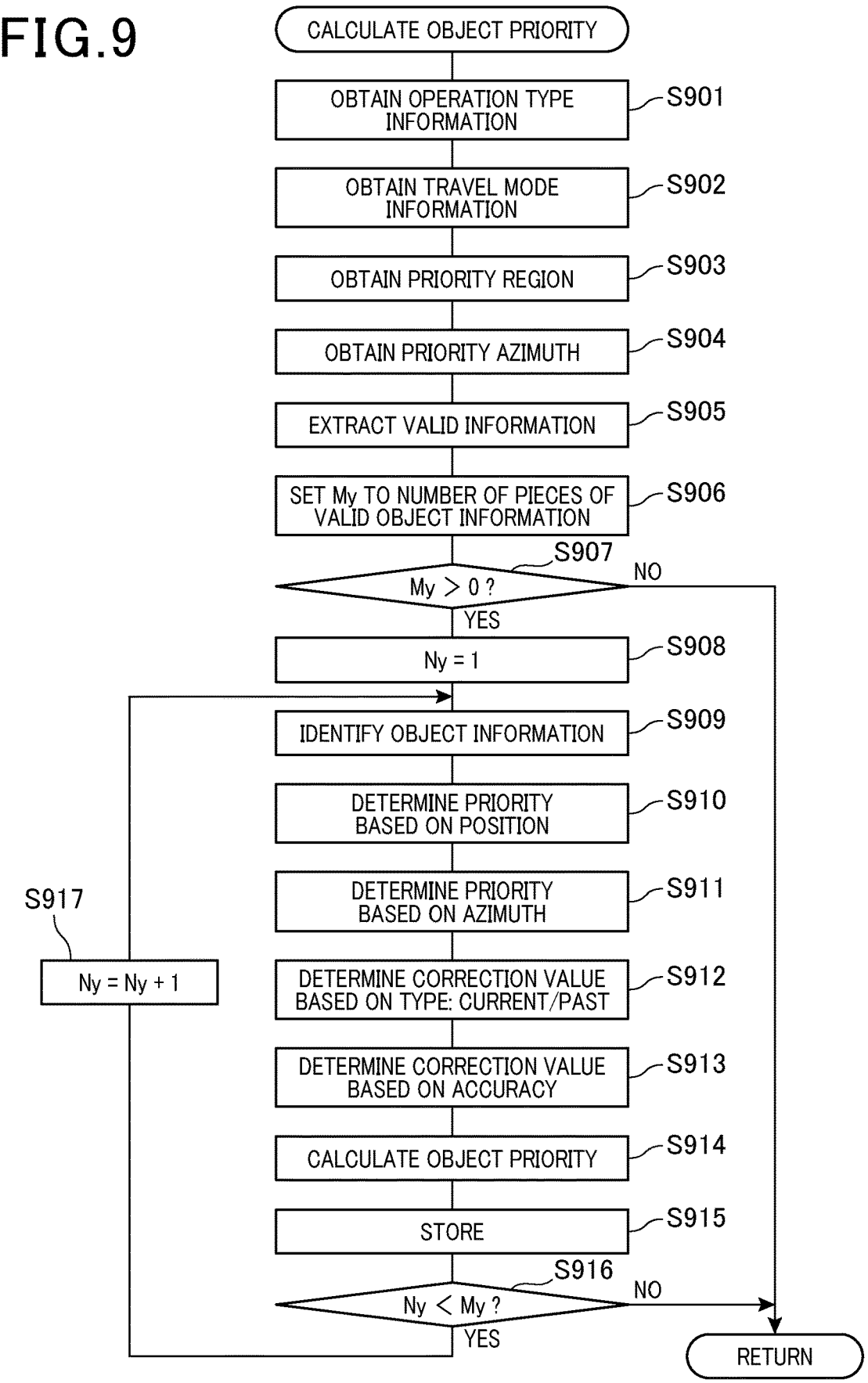
FIG. 9 is a flowchart showing one operation example of the information processing device shown in FIG. 2.

In the calculation of the object priority shown in FIG. 9, the above specific example may also be changed, as appropriate. Specifically, for example, the priority Y1 based on the positional relationship information may be divided and determined as priority Y11 based on whether the detected object is the object of interest and priority Y12 based on the positional relationship with the priority region.

At least one of the priority Y1 based on the positional relationship information, the priority Y2 based on the azimuth information, the correction value Y3 based on the type indicating the current object information or the past object information, and the correction value Y4 based on the detection accuracy may be omitted.

Here, Y3 may be priority instead of the correction value. The same also applies to Y4.

The conceptually similar expressions such as "calculating", "computing", "obtaining", and "estimating" are interchangeable with each other unless a technical contraction occurs. The inequality sign in each determination process may or may not accompany the equal sign. Specifically, for example, the wording "greater than or equal to the threshold value" can be changed into the wording "exceeding the threshold value".

It goes without saying that the elements included in the above embodiment are not necessarily indispensable unless otherwise indicated in particular or considered obviously indispensable in principle, for example. Furthermore, when the numerical figures, such as the number, numerical values, amount, range, etc., of structural elements are mentioned, the present disclosure is not limited to these specific numerical figures unless indicated as required in particular or obviously limited in principle to a specific figure, for example. Likewise, when the shape, direction, positional relationship, etc., of the structural elements and the like are mentioned, the present disclosure is not limited to these shape, direction, positional relationship, etc., unless indicated as required in particular or limited in principle to specific shape, direction, positional relationship, etc., for example.

The modification is not limited to the above-described example. Furthermore, two or more modifications can be combined together. Moreover, the entirety or a portion of the above embodiment and the entirety or a portion of the modification can be combined together.

The functional configuration and method described above may be implemented by a special purpose computer created by configuring a memory and a processor programmed to execute one or more particular functions embodied in computer programs. Alternatively, the functional configuration and method described above may be implemented by a special purpose computer created by configuring a processor provided by one or more special purpose hardware logic circuits. Alternatively, the functional configuration and method described above may be implemented by one or more special purpose computers created by configuring a combination of a memory and a processor programmed to execute one or more particular functions and a processor provided by one or more hardware logic circuits. The computer programs may be stored in a tangible non-transitory computer-readable medium as instructions that is executed by a computer.

What is claimed is:

1. An information processing device for a vehicle, comprising:
   an object detecting unit configured to detect, based on an output of a sensor mounted on the vehicle, an object located around the vehicle;
   an object information storage unit configured to store, as object information, information about the object detected by the object detecting unit; and
   an object information management unit configured to:
      receive, from a travelling assistance unit that performs an assistance operation of assisting travelling of the vehicle based on the object information, related information, the related information being related to the assistance operation performed by the travelling assistance unit;
      obtain a priority region of assistance operation that is currently being performed by the travelling assistance unit based on the related information;
      determine storage priority of the object information in the object information storage unit based on the priority region of assistance operation; and
      manage a storage state of the object information in the object information storage unit based on the storage priority, wherein
   the travelling assistance unit performs the assistance operation of assisting travelling of the vehicle based on the object information.

2. The information processing device according to claim 1, wherein
   the related information includes one of (i) travel mode information indicative of a travel mode of the vehicle in the assistance operation and (ii) interest information indicative of a degree of interest in the object in the assistance operation; and
   the object information management unit is configured to determine the storage priority based on the one of the travel mode information and the interest information.

3. The information processing device according to claim 1, wherein
the related information includes one of (i) parking mode information and (ii) positional relationship information if the assistance operation is a parking assistance operation of assisting parking of the vehicle,
the parking mode information representing a mode of the vehicle to be parked in the parking assistance operation,
the positional relationship information representing a positional relationship between the object and one of a target parking space and one or more candidates of the target parking; and
the object information management unit is configured to determine the storage priority in accordance with the one of the parking mode information and the positional relationship information.

4. The information processing device according to claim 1, wherein
the object information management unit is configured to determine the storage priority based on the related information and an azimuth of the object of the object information.

5. The information processing device according to claim 1, wherein
the object information management unit is configured to determine the storage priority based on the related information and a detection accuracy of the object of the object information.

6. The information processing device according to claim 5, wherein
the object information management unit is configured to:
reduce the storage priority with a decrease in the detection accuracy; and
curb a reduction of the storage priority with the decrease in the detection accuracy if the object of the object information is located in a travelling direction of the vehicle.

7. The information processing device according to claim 1, wherein the object information includes a plurality of object information items about one or more objects detected by the object detecting unit, the information processing device further comprising:
an object information selection unit configured to:
determine, based on the related information, transfer priority of each of the object information items stored in the object information storage unit; and
select, based on the transfer priority of each of the object information items, one of the object information items to be transferred to the travelling assistance unit.

8. The information processing device according to claim 7, wherein
the related information includes one of (i) travel mode information indicative of a travel mode of the vehicle in the assistance operation and (ii) interest information indicative of a degree of interest in the one or more objects in the assistance operation; and
the object information management unit is configured to determine the transfer priority of each of the object information items based on the one of the travel mode information and the interest information.

9. The information processing device according to claim 7, wherein
the related information includes one of (i) parking mode information and (ii) positional relationship information if the assistance operation is a parking assistance operation of assisting parking of the vehicle,
the parking mode information representing a mode of the vehicle to be parked in the parking assistance operation,
the positional relationship information representing a positional relationship between the one or more objects and one of a target parking space and one or more candidates of the target parking; and
the object information selection unit is configured to determine the transfer priority of each of the object information items in accordance with the one of the parking mode information and the positional relationship information.

10. The information processing device according to claim 7, wherein
the object information selection unit is configured to determine the transfer priority of each of the object information items based on the related information and an azimuth of the one or more objects of the object information items.

11. The information processing device according to claim 7, wherein
the object information selection unit is configured to determine the transfer priority of each of the object information items based on the related information and a detection accuracy of the one or more objects of the object information items.

12. The information processing device according to claim 11, wherein
the object information management unit is configured to:
reduce the transfer priority of each of the object information items with a decrease in the detection accuracy; and
curb a reduction of the transfer priority of each of the object information items with the decrease in the detection accuracy if the one or more objects of the object information items are located in a travelling direction of the vehicle.

13. An information processing method which is performed by an information processing device for a vehicle, the information processing method comprising:
detecting, based on an output of a sensor mounted on the vehicle, an object located around the vehicle;
storing, into an object information storage unit, as object information, information about the object detected by the object detecting unit;
receiving, from a travelling assistance unit that performs an assistance operation of assisting travelling of the vehicle based on the object information, related information, the related information being related to the assistance operation performed by the travelling assistance unit;
obtaining a priority region of assistance operation that is currently being performed by the travelling assistance unit based on the related information;
determining storage priority of the object information in the object information storage unit based on the priority region of assistance operation; and
managing a storage state of the object information in the object information storage unit based on the storage priority, wherein
the travelling assistance unit performs the assistance operation of assisting travelling of the vehicle based on the object information.

14. The information processing method according to claim 13, wherein the related information includes one of (i) travel mode information indicative of a travel mode of the vehicle in the assistance operation and (ii) interest information indicative of a degree of interest in the object in the assistance operation; and the information processing method further comprising:
determining the storage priority based on the one of the travel mode information and the interest information.

15. The information processing method according to claim 13, wherein
the related information includes one of (i) parking mode information and (ii) positional relationship information if the assistance operation is a parking assistance operation of assisting parking of the vehicle,
the parking mode information representing a mode of the vehicle to be parked in the parking assistance operation,
the positional relationship information representing a positional relationship between the object and one of a target parking space and one or more candidates of the target parking; and
the information processing method further comprising:
determining the storage priority in accordance with the one of the parking mode information and the positional relationship information.

16. The information processing method according to claim 13, wherein
the information processing method further comprising:
determining the storage priority based on the related information and an azimuth of the object of the object information.

17. The information processing method according to claim 13, wherein
the information processing method further comprising:
determining the storage priority based on the related information and a detection accuracy of the object of the object information.

18. The information processing method according to claim 17, wherein
the information processing method further comprising:
reducing the storage priority with a decrease in the detection accuracy; and,
curbing a reduction of the storage priority with the decrease in the detection accuracy if the object of the object information is located in a travelling direction of the vehicle.

19. The information processing method according to claim 13, wherein
the object information includes a plurality of object information items about one or more objects detected by the object detecting unit, and
the information processing method further comprising:
determining, based on the related information, transfer priority of each of the object information items stored in the object information storage unit; and
selecting, based on the transfer priority of each of the object information items, one of the object information items to be transferred to the travelling assistance unit.

20. The information processing method according to claim 19, wherein
the related information includes one of (i) travel mode information indicative of a travel mode of the vehicle in the assistance operation and (ii) interest information indicative of a degree of interest in the one or more objects in the assistance operation; and
the information processing method further comprising:
determining the transfer priority of each of the object information items based on the one of the travel mode information and the interest information.

21. The information processing method according to claim 19, wherein
the related information includes one of (i) parking mode information and (ii) positional relationship information if the assistance operation is a parking assistance operation of assisting parking of the vehicle,
the parking mode information representing a mode of the vehicle to be parked in the parking assistance operation,
the positional relationship information representing a positional relationship between the one or more objects and one of a target parking space and one or more candidates of the target parking; and
the information processing method further comprising:
determining the transfer priority of each of the object information items in accordance with the one of the parking mode information and the positional relationship information.

22. The information processing method according to claim 19, wherein
the information processing method further comprising:
determining the transfer priority of each of the object information items based on the related information and an azimuth of the one or more objects of the object information items.

23. The information processing method according to claim 19, wherein
the information processing method further comprising:
determining the transfer priority of each of the object information items based on the related information and a detection accuracy of the one or more objects of the object information items.

24. The information processing method according to claim 23, wherein
the information processing method further comprising:
reducing the transfer priority of each of the object information items with a decrease in the detection accuracy; and,
curbing a reduction of the transfer priority of each of the object information items with the decrease in the detection accuracy if the one or more objects of the object information items are located in a travelling direction of the vehicle.

* * * * *